US012587883B2

(12) United States Patent
Bai et al.

(10) Patent No.: US 12,587,883 B2
(45) Date of Patent: Mar. 24, 2026

(54) MEASURING A SUBSET OF REFERENCE SIGNALS BASED ON HISTORIC INFORMATION

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 460 days.

(21) Appl. No.: 18/194,233

(22) Filed: Mar. 31, 2023

(65) Prior Publication Data

US 2024/0334217 A1      Oct. 3, 2024

(51) Int. Cl.
    *H04W 24/08*          (2009.01)
    *H04L 5/00*           (2006.01)
(52) U.S. Cl.
    CPC ........... *H04W 24/08* (2013.01); *H04L 5/0048* (2013.01)
(58) Field of Classification Search
    CPC ..... H04W 24/08; H04L 5/0048; H04B 7/0695
    See application file for complete search history.

(56) References Cited

U.S. PATENT DOCUMENTS

2011/0039574 A1*   2/2011   Charbit ................. G01S 5/0215
                                                            455/67.14
2016/0065279 A1*   3/2016   Wang .................... H04L 5/0048
                                                            375/267

2016/0205677 A1*   7/2016   Kim ...................... H04L 5/0048
                                                            370/329
2021/0050975 A1*   2/2021   Rico Alvarino ...... H04L 5/0069
2021/0067978 A1*   3/2021   Cheraghi .............. H04W 24/10
2021/0282111 A1*   9/2021   Yamada ................ H04L 5/0051
2021/0336683 A1   10/2021   Pezeshki et al.
2021/0336687 A1   10/2021   Pezeshki et al.
2022/0110088 A1*   4/2022   Bao ....................... G01S 5/0205
2022/0407745 A1*  12/2022   Lo .......................... H04W 24/02
2023/0061890 A1*   3/2023   Cui ....................... H04L 5/0051
2024/0275641 A1*   8/2024   Shojaeifard .......... H04L 5/0085
2024/0365146 A1*  10/2024   Hu ......................... H04W 24/10

OTHER PUBLICATIONS

International Search Report and Written Opinion—PCT/US2024/012901—ISA/EPO—May 3, 2024.

* cited by examiner

*Primary Examiner* — Kevin T Bates
*Assistant Examiner* — Hector Reyes
(74) *Attorney, Agent, or Firm* — Harrity & Harrity, LLP

(57)          ABSTRACT

Various aspects of the present disclosure generally relate to wireless communication. In some aspects, a user equipment (UE) may receive reference signal information that indicates one or more reference signal subsets that are based at least in part on a set of reference signals, each reference signal subset of the one or more reference signal subsets being based at least in part on historic information associated with the set of reference signals. The UE may select a reference signal subset from the one or more reference signal subsets based at least in part on an operating condition of the UE. The UE may perform a measurement procedure based at least in part on the reference signal subset. Numerous other aspects are described.

30 Claims, 9 Drawing Sheets

502 →

| Best RS ID 514 | First Distance RS Subset IDs 516 | Second Distance RS Subset IDs 518 |
|---|---|---|
| 1 | 1, 2, 3 | 5, 9, 2 |
| 2 | 2, 3, 4 | 8, 7, 6 |
| 3 | 5, 6, 7 | 2, 3, 9 |

| Anchor Location (x, y, z) 506 | RS Subset IDs 508 |
|---|---|
| x1, y1, z1 | 1, 2, 3 |
| x2, y2, z2 | 2, 3, 4 |
| x3, y3, z3 | 5, 6, 7 |

| Best RS ID 522 | First Direction RS Subset IDs 524 | Second Direction RS Subset IDs 526 |
|---|---|---|
| 1 | 1, 2, 3 | 3, 4, 5 |
| 2 | 2, 1, 3 | 9, 6, 3 |
| 3 | 5, 6, 7 | 4, 9, 1 |

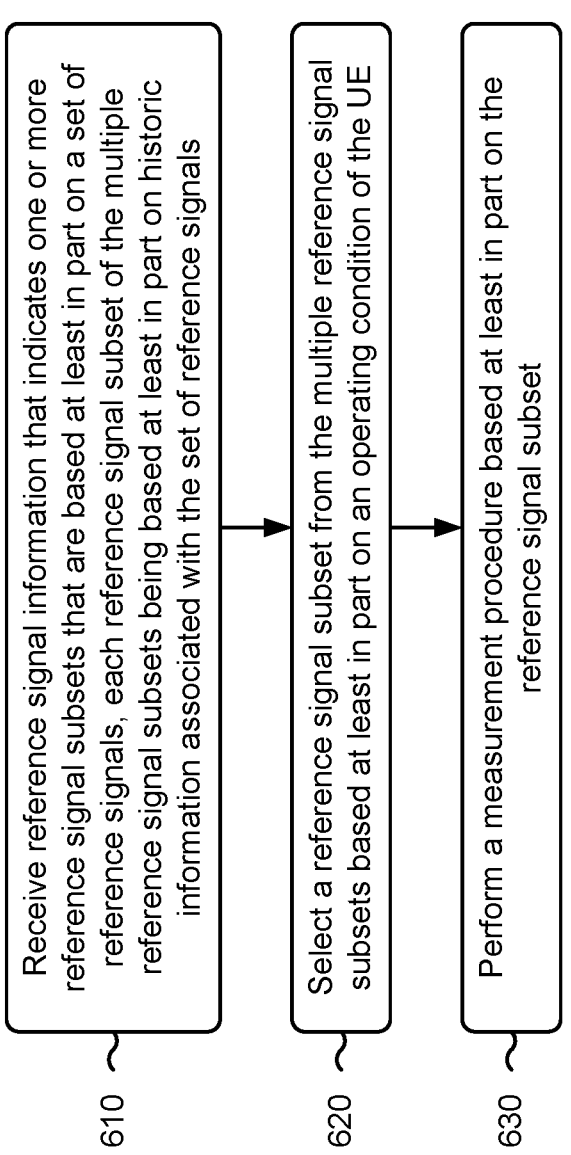

600

610 Receive reference signal information that indicates one or more reference signal subsets that are based at least in part on a set of reference signals, each reference signal subset of the multiple reference signal subsets being based at least in part on historic information associated with the set of reference signals 620 Select a reference signal subset from the multiple reference signal subsets based at least in part on an operating condition of the UE 630 Perform a measurement procedure based at least in part on the reference signal subset

FIG. 6

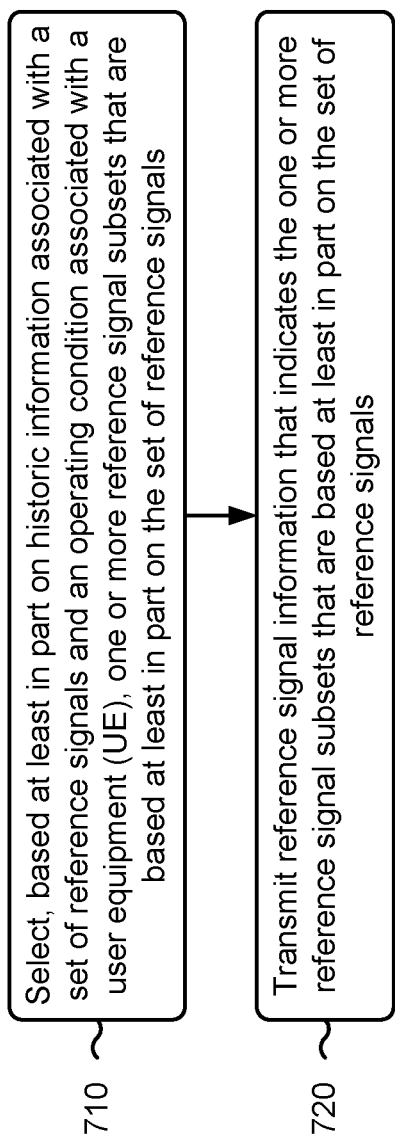

700

710 — Select, based at least in part on historic information associated with a set of reference signals and an operating condition associated with a user equipment (UE), one or more reference signal subsets that are based at least in part on the set of reference signals 720 — Transmit reference signal information that indicates the one or more reference signal subsets that are based at least in part on the set of reference signals

FIG. 7

MEASURING A SUBSET OF REFERENCE SIGNALS BASED ON HISTORIC INFORMATION

FIELD OF THE DISCLOSURE

Aspects of the present disclosure generally relate to wireless communication and to techniques and apparatuses for measuring a subset of reference signals based on historic information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving reference signal information that indicates one or more reference signal subsets that are based at least in part on a set of reference signals, each reference signal subset of the one or more reference signal subsets being based at least in part on historic information associated with the set of reference signals. The method may include selecting a reference signal subset from the one or more reference signal subsets based at least in part on an operating condition of the UE. The method may include performing a measurement procedure based at least in part on the reference signal subset.

Some aspects described herein relate to a method of wireless communication performed by a network node. The method may include selecting, based at least in part on historic information associated with a set of reference signals and an operating condition associated with a UE, one or more reference signal subsets that are based at least in part on the set of reference signals. The method may include transmitting reference signal information that indicates the one or more reference signal subsets that are based at least in part on the set of reference signals.

Some aspects described herein relate to an apparatus for wireless communication at a UE. The apparatus may include a memory and one or more processors coupled to the memory. The one or more processors may be configured to cause the UE to receive reference signal information that indicates one or more reference signal subsets that are based at least in part on a set of reference signals, each reference signal subset of the one or more reference signal subsets being based at least in part on historic information associated with the set of reference signals. The one or more processors may be configured to cause the UE to select a reference signal subset from the one or more reference signal subsets based at least in part on an operating condition of the UE. The one or more processors may be configured to cause the UE to perform a measurement procedure based at least in part on the reference signal subset.

Some aspects described herein relate to an apparatus for wireless communication at a network node. The apparatus may include a memory and one or more processors coupled to the memory. The one or more processors may be configured to cause the network node to select, based at least in part on historic information associated with a set of reference signals and an operating condition associated with a UE, one or more reference signal subsets that are based at least in part on the set of reference signals. The one or more processors may be configured to cause the network node to transmit reference signal information that indicates the one or more reference signal subsets that are based at least in part on the set of reference signals.

Some aspects described herein relate to a non-transitory computer-readable medium that stores a set of instructions for wireless communication by a UE. The set of instructions, when executed by one or more processors of the UE, may cause the UE to receive reference signal information that indicates one or more reference signal subsets that are based at least in part on a set of reference signals, each reference signal subset of the one or more reference signal subsets being based at least in part on historic information associated with the set of reference signals. The set of instructions, when executed by one or more processors of the UE, may cause the UE to select a reference signal subset from the one or more reference signal subsets based at least in part on an operating condition of the UE. The set of instructions, when executed by one or more processors of the UE, may cause the UE to perform a measurement procedure based at least in part on the reference signal subset.

Some aspects described herein relate to a non-transitory computer-readable medium that stores a set of instructions for wireless communication by a network node. The set of instructions, when executed by one or more processors of the network node, may cause the network node to select, based at least in part on historic information associated with a set of reference signals and an operating condition associated with a UE, one or more reference signal subsets that are based at least in part on the set of reference signals. The set of instructions, when executed by one or more processors of the network node, may cause the network node to transmit reference signal information that indicates the one or more reference signal subsets that are based at least in part on the set of reference signals.

Some aspects described herein relate to an apparatus for wireless communication. The apparatus may include means for receiving reference signal information that indicates one or more reference signal subsets that are based at least in part on a set of reference signals, each reference signal subset of the one or more reference signal subsets being based at least in part on historic information associated with the set of reference signals. The apparatus may include means for selecting a reference signal subset from the one or more reference signal subsets based at least in part on an operating condition of the UE. The apparatus may include means for performing a measurement procedure based at least in part on the reference signal subset.

Some aspects described herein relate to an apparatus for wireless communication. The apparatus may include means for selecting, based at least in part on historic information associated with a set of reference signals and an operating condition associated with a UE, one or more reference signal subsets that are based at least in part on the set of reference signals. The apparatus may include means for transmitting reference signal information that indicates the one or more reference signal subsets that are based at least in part on the set of reference signals.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A, 5B, and 5C are diagrams illustrating a first example, a second example, and a third example of reference signal information, in accordance with the present disclosure.

FIG. 6 is a diagram illustrating an example process performed, for example, by a UE, in accordance with the present disclosure.

FIG. 7 is a diagram illustrating an example process performed, for example, by a network node, in accordance with the present disclosure.

DETAILED DESCRIPTION

Figure 1:
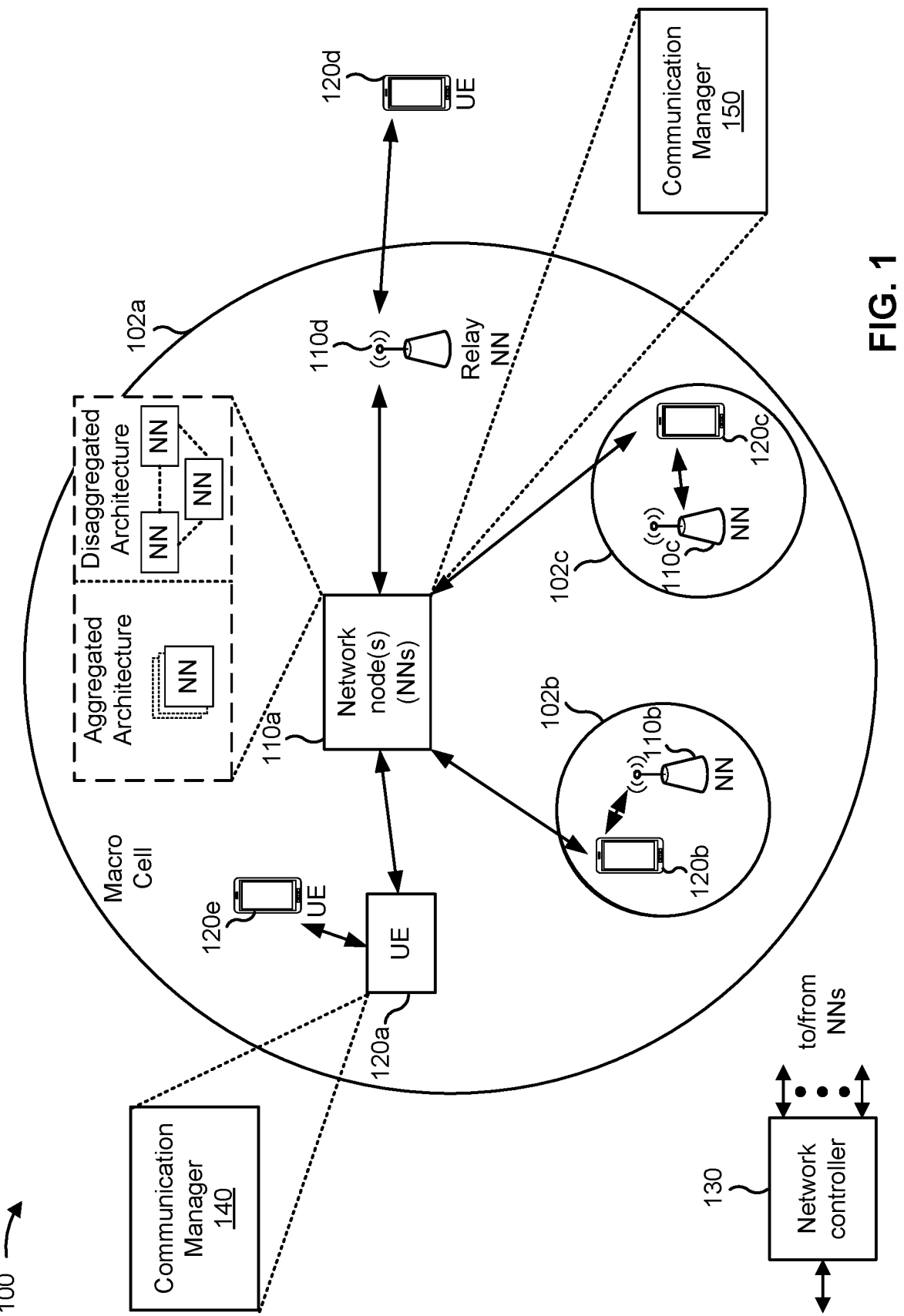
FIG. 1 is a diagram illustrating an example of a wireless network, in accordance with the present disclosure.

A user equipment (UE) may measure and/or evaluate an entirety of synchronization signal blocks (SSBs) transmitted by a network node to identify a best SSB to use for communicating with a network node. To illustrate, measuring all of the SSBs may enable the UE to identify a best beam (that carries the SSB) to use for communicating with the network node. Measuring all of the SSBs within the set of SSBs, however, may increase a complexity of operations performed by the UE and/or increase power consumption at the UE, resulting in a shorter battery life at the UE.

Some techniques and apparatuses described herein provide for measuring a subset of reference signals based on historic information. In some aspects, a network node may select, based at least in part on historic information and an operating condition associated with the UE, one or more reference signal subsets. The network node may transmit reference signal information that indicates the one or more reference signal subsets.

A UE may receive reference signal information that indicates one or more reference signal subsets, and the reference signal subsets may be based at least in part on a set of reference signals. In some aspects, the UE may select a reference signal subset from the reference signal subset(s) based at least in part on an operating condition of the UE. To illustrate, the UE may compare the operating condition of the UE to operating condition(s) associated with the reference signal information, and select a reference signal subset that is associated with a commensurate operating condition (e.g., within a range of values and/or within a threshold). Based at least in part on selecting the reference signal subset, the UE may perform a measurement procedure using the reference signal subset.

A reference signal subset that is based at least in part on historic information may enable a UE to leverage information from other UEs and reduce a number of reference signals measured and/or evaluated by the UE. Leveraging the information may enable the UE to maintain a signal quality for communications between the UE and the network node, reduce the complexity of operations performed by the UE, and preserve a battery life of the UE.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an CNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., the UE 120) may include a communication manager 140. As described in more detail elsewhere herein, the communication manager 140 may receive reference signal information that indicates one or more reference signal subsets that are based at least in part on a set of reference signals, each reference signal subset of the one or more reference signal subsets being based at least in part on historic information associated with the set of reference signals; select a reference signal subset from the one or more reference signal subsets based at least in part on an operating condition of the UE; and perform a measurement procedure based at least in part on the reference signal subset. Additionally, or alternatively, the communication manager 140 may perform one or more other operations described herein.

In some aspects, a network node (e.g., the network node 110) may include a communication manager 150. As described in more detail elsewhere herein, the communication manager 150 may select, based at least in part on historic information associated with a set of reference signals and an operating condition associated with a UE, one or more reference signal subsets that are based at least in part on the set of reference signals; and transmit reference signal information that indicates the one or more reference signal subsets that are based at least in part on the set of reference signals. Additionally, or alternatively, the communication manager 150 may perform one or more other operations described herein.

As indicated above, FIG. 1 is provided as an example. Other examples may differ from what is described with regard to FIG. 1.

Figure 2:
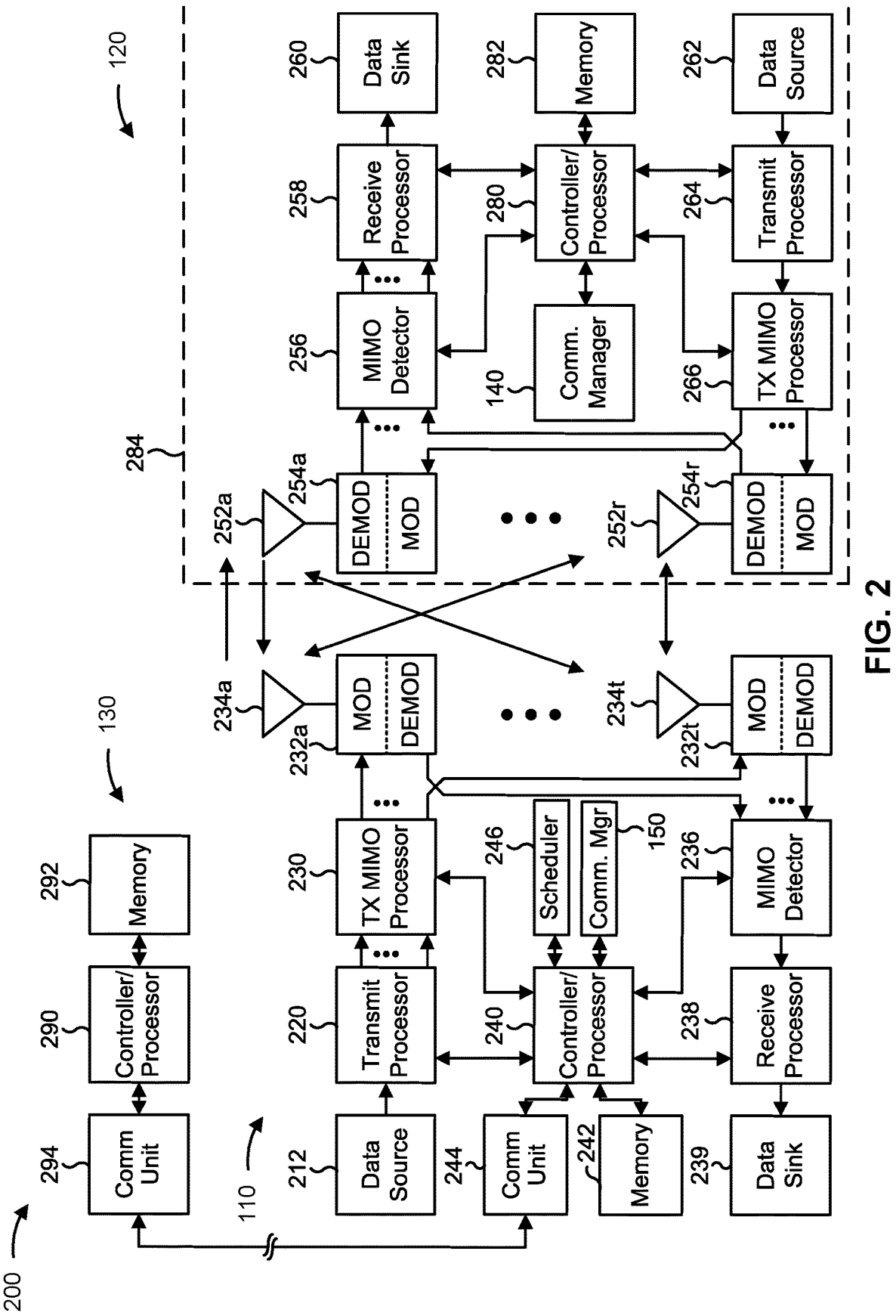
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-9).

The controller/processor 240 of the network node 110, the controller/processor 280 of the UE 120, and/or any other component(s) of FIG. 2 may perform one or more techniques associated with measuring a subset of reference signals based on historic information, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving reference signal information that indicates one or more reference signal subsets that are based at least in part on a set of reference signals, each reference signal subset of the one or more reference signal subsets being based at least in part on historic information associated with the set of reference signals; means for selecting a reference signal subset from the one or more reference signal subsets based at least in part on an operating condition of the UE; and/or means for performing a measurement procedure based at least in part on the reference signal subset. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for selecting, based at least in part on historic information associated with a set of reference signals and an operating condition associated with a UE, one or more reference signal subsets that are based at least in part on the set of reference signals; and/or means for transmitting reference signal information that indicates the one or more reference signal subsets that are based at least in part on the set of reference signals. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (CNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
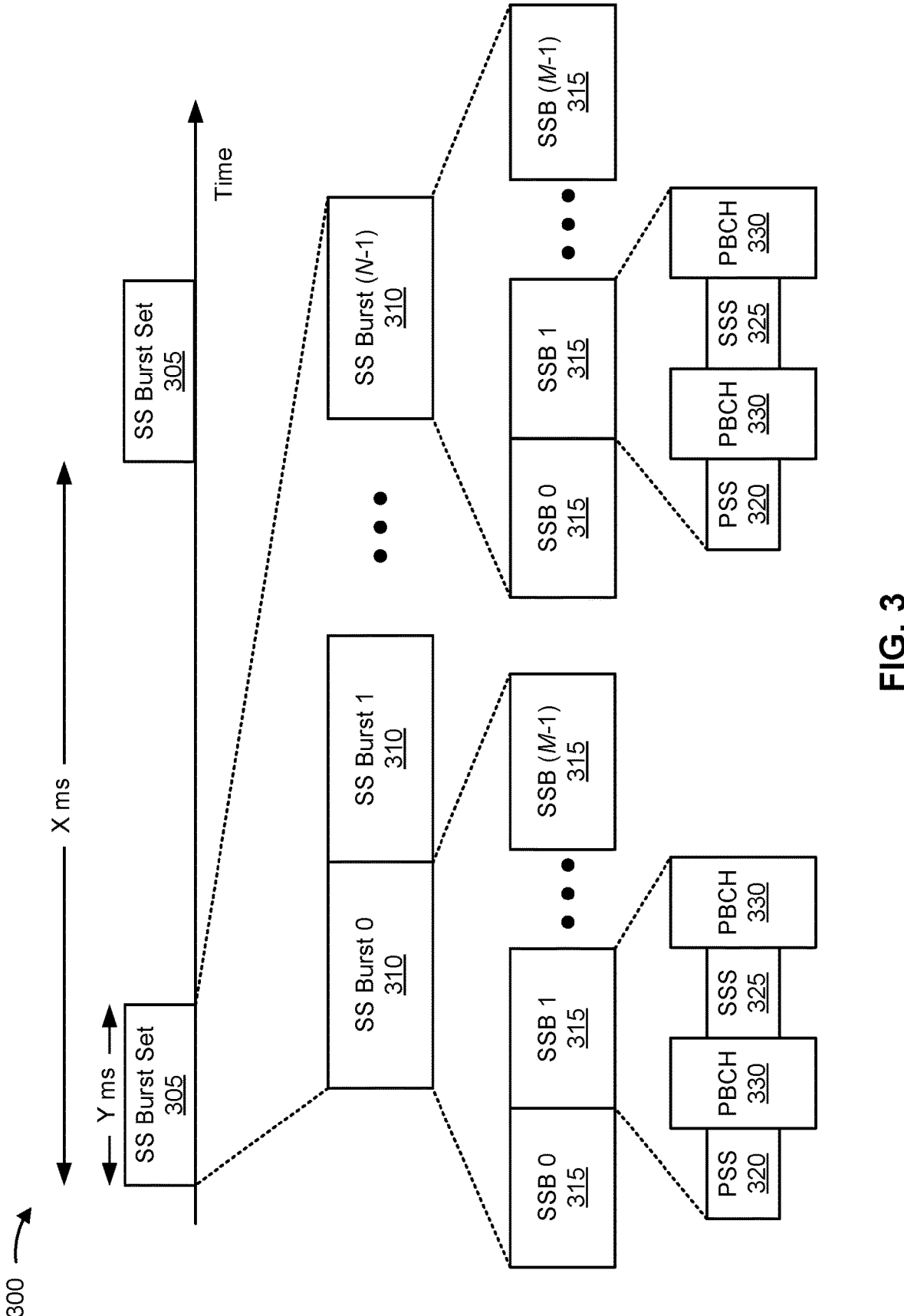
FIG. 3 is a diagram illustrating an example of a synchronization signal (SS) hierarchy, in accordance with the present disclosure.

FIG. 3 is a diagram illustrating an example 300 of a synchronization signal (SS) hierarchy, in accordance with the present disclosure. As shown in FIG. 3, the SS hierarchy may include an SS burst set 305, which may include multiple SS bursts 310, shown as SS burst 0 through SS burst N−1, where N is a maximum number of repetitions of the SS burst 310 that may be transmitted by one or more network nodes. As further shown, each SS burst 310 may include one or more SSBs 315, shown as SSB 0 through SSB M−1, where M is a maximum number of SSBs 315 that can be carried by an SS burst 310. In some aspects, different SSBs 315 may be beam-formed differently (e.g., transmitted using different beams), and may be used for cell search, cell acquisition, beam management, and/or beam selection (e.g., as part of an initial network access procedure). An SS burst set 305 may be periodically transmitted by a wireless node (e.g., a network node 110), such as every X milliseconds, as shown in FIG. 3. In some aspects, an SS burst set 305 may have a fixed or dynamic length, shown as Y milliseconds in FIG. 3. In some cases, an SS burst set 305 or an SS burst 310 may be referred to as a discovery reference signal (DRS) transmission window or an SSB measurement time configuration (SMTC) window.

In some aspects, an SSB 315 may include resources that carry a PSS 320, an SSS 325, and/or a physical broadcast channel (PBCH) 330. In some aspects, multiple SSBs 315 are included in an SS burst 310 (e.g., with transmission on different beams), and the PSS 320, the SSS 325, and/or the PBCH 330 may be the same across each SSB 315 of the SS burst 310. In some aspects, a single SSB 315 may be included in an SS burst 310. In some aspects, the SSB 315 may be at least four symbols (e.g., OFDM symbols) in length, where each symbol carries one or more of the PSS 320 (e.g., occupying one symbol), the SSS 325 (e.g., occupying one symbol), and/or the PBCH 330 (e.g., occupying two symbols). In some aspects, an SSB 315 may be referred to as an SS/PBCH block.

In some aspects, the symbols of an SSB 315 are consecutive, as shown in FIG. 3. In some aspects, the symbols of an SSB 315 are non-consecutive. Similarly, in some aspects, one or more SSBs 315 of the SS burst 310 may be transmitted in consecutive radio resources (e.g., consecutive symbols) during one or more slots. Additionally, or alternatively, one or more SSBs 315 of the SS burst 310 may be transmitted in non-consecutive radio resources.

In some aspects, the SS bursts 310 may have a burst period, and the SSBs 315 of the SS burst 310 may be transmitted by a wireless node (e.g., a network node 110) according to the burst period. In this case, the SSBs 315 may be repeated during each SS burst 310. In some aspects, the SS burst set 305 may have a burst set periodicity, whereby the SS bursts 310 of the SS burst set 305 are transmitted by the wireless node according to the fixed burst set periodicity. In other words, the SS bursts 310 may be repeated during each SS burst set 305.

In some aspects, an SSB 315 may include an SSB index, which may correspond to a beam used to carry the SSB 315. A UE 120 may monitor for and/or measure SSBs 315 using different receive (Rx) beams during an initial network access procedure and/or a cell search procedure, among other examples. Based at least in part on the monitoring and/or measuring, the UE 120 may indicate one or more SSBs 315 with a best signal parameter (e.g., an RSRP parameter) to a network node 110 (e.g., directly or via one or more other network nodes). The network node 110 and the UE 120 may use the one or more indicated SSBs 315 to select one or more beams to be used for communication between the network node 110 and the UE 120 (e.g., for a random access channel (RACH) procedure). Additionally, or alternatively, the UE 120 may use the SSB 315 and/or the SSB index to determine a cell timing for a cell via which the SSB 315 is received (e.g., a serving cell).

In some aspects, after a UE is admitted into a cell, the UE may lack information about SSB coverage in the cell, such as beam direction(s) that carry the SSBs, SSB received power levels, and/or a best SSB out of a set of SSBs (e.g., an SSB with a higher received power level at the UE relative to other SSBs). Accordingly, without the information about the SSB coverage, the UE may measure and/or evaluate all of the SSBs in the set of SSBs to select the best SSB and, subsequently, the best beam that carries the best SSB, for communicating with the network node. In some aspects, the UE may measure and/or evaluate all of the SSBs in the set of SSBs when operating in a reduced power consumption mode (e.g., a radio resource control (RRC) IDLE state and/or an RRC INACTIVE state). To illustrate, when operating in an RRC IDLE state, the UE may measure and/or evaluate all of the SSBs in the set to identify the best SSB and beam to use for monitoring for a common search space (CSS) physical downlink control channel (PDCCH). As another example, the UE may monitor all of the SSBs in the set when operating in the RRC INACTIVE mode to identify the best SSB and/or best beam for a small data transmission (SDT) via a configured grant and/or for a RACH occasion.

Measuring the SSBs may enable the UE to identify an SSB and, subsequently, a beam that increases a signal quality (e.g., an increased power level and/or reduced interference) of communications between the UE and a network node. Measuring all of the SSBs within the set of SSBs, however, may increase a complexity of operations performed by the UE and/or increase power consumption at the UE, resulting in a shorter battery life at the UE.

Some techniques and apparatuses described herein provide for measuring a subset of reference signals based on historic information. In some aspects, a network node may select, based at least in part on historic information and an operating condition associated with a UE, one or more reference signal subsets. As described below, the historic information may be based at least in part on past reference signals used by other UEs to communicate with the network node. A reference signal subset may be based at least in part on the set of reference signals. That is, each reference signal subset may include one or more reference signals included in the set of reference signals, and the network node may select each reference signal to include in the reference signal subset based at least in part on the historic information. The network node may transmit reference signal information that indicates the one or more reference signal subsets.

A UE may receive reference signal information that indicates one or more reference signal subsets, and the reference signal subsets may be based at least in part on a set of reference signals. In some aspects, the reference signal information (and/or the reference signal subset(s) indicated by the reference signal information) may be associated with an operating condition and/or a potential operating condition, such as a location, a direction, and/or a signal metric as described below. Alternatively, or additionally, the reference signal subsets may be based at least in part on historic information. In some aspects, the UE may select a reference signal subset from the reference signal subset(s) based at least in part on an operating condition of the UE. To illustrate, the UE may compare the operating condition of the UE to operating condition(s) associated with the reference signal information, and select a reference signal subset that is associated with a commensurate operating condition (e.g., within a range of values and/or within a threshold). Based at least in part on selecting the reference signal subset, the UE may perform a measurement procedure using the reference signal subset.

A reference signal subset that is based at least in part on historic information may enable a UE to leverage information from other UEs and reduce a number of reference signals (e.g., SSBs) measured and/or evaluated by the UE. That is, the UE may identify a best reference signal (and associated beam) from a subset of reference signals, rather than the full set of reference signals, based at least in part on information that indicates reference signals and/or beams that have been selected by other UEs with similar operating condition(s). Leveraging the information may enable the UE to maintain a signal quality for communications between the UE and the network node, reduce the complexity of operations performed by the UE, and preserve a battery life of the UE.

As indicated above, FIG. 3 is provided as an example. Other examples may differ from what is described with regard to FIG. 3.

Figure 4:
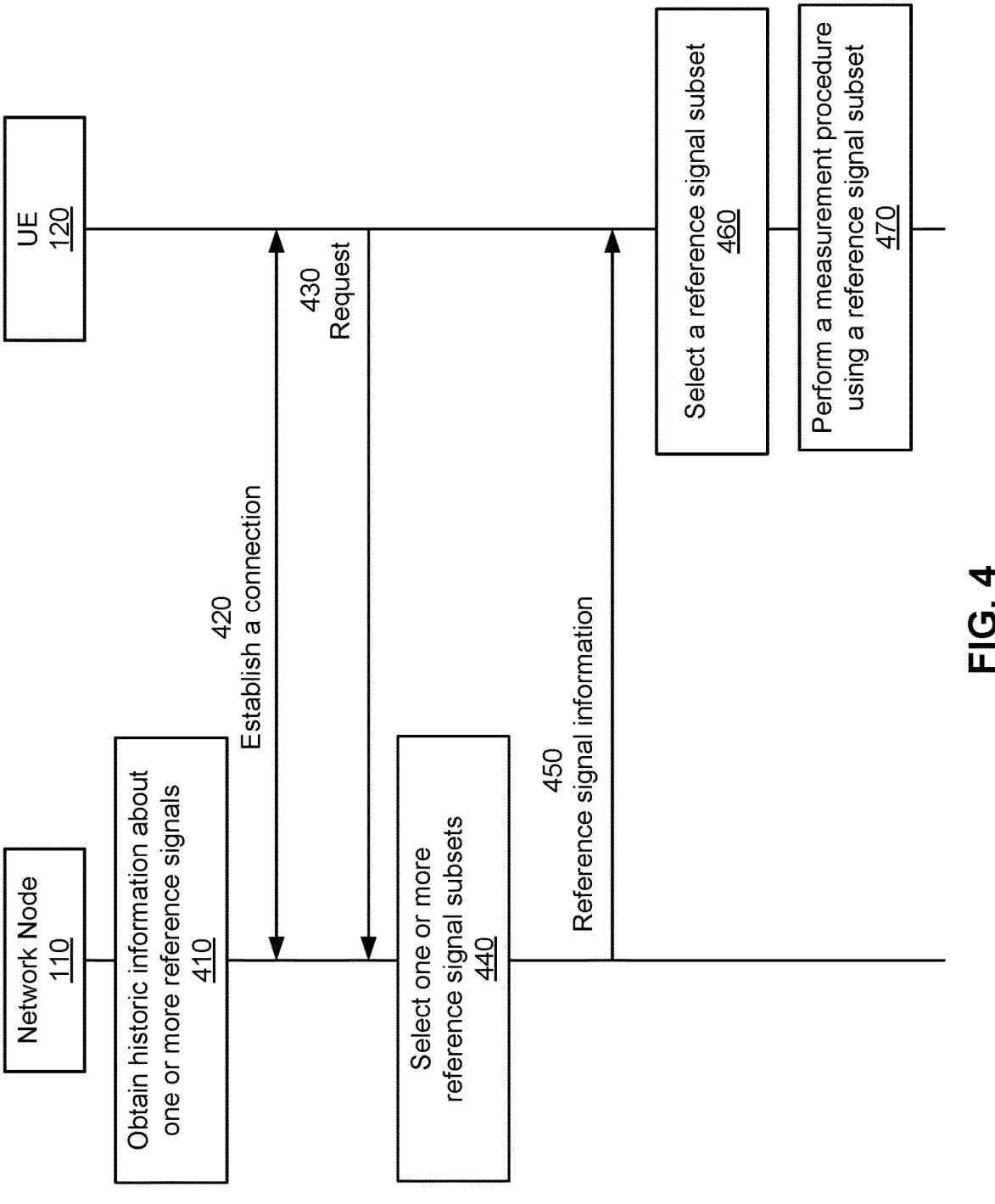
FIG. 4 is a diagram illustrating an example of a wireless communication process between a network node and a UE, in accordance with the present disclosure.

FIG. 4 is a diagram illustrating an example 400 of a wireless communication process between a network node (e.g., the network node 110) and a UE (e.g., the UE 120), in accordance with the present disclosure.

As shown by reference number 410, a network node 110 may obtain historic information associated with one or more reference signals. In some aspects, the historic information may indicate one or more reference signals that are associated with any combination of a location, a direction, a movement pattern, a signal metric, a distance, and/or a validity time window. For example, the network node 110 may generate the historic information using connection information (e.g., a selected SSB, a selected beam, and/or an operating condition) that is associated with other UEs that connect to the network node prior to the UE 120 (e.g., prior UEs).

To illustrate, the network node 110 may store reference signal information and/or beam information that is associated with a beam selected and used by a prior UE to transmit a RACH to the network node 110. That is, the network node 110 may identify a preferred beam (e.g., from a set of beams) that is selected by the prior UE for transmitting the RACH. For example, the prior UE may select the preferred beam based at least in part on a signal metric associated with a reference signal carried by the preferred beam. In some aspects, the prior UE may indicate the signal metric to the network node 110, and the network node 110 may store and/or associate the signal metric with the respective beam and/or the respective reference signal. Alternatively, or additionally, the network node 110 may store and/or associate location information with the preferred beam and/or the preferred reference signal, such as location information of the prior UE.

In some aspects, the network node 110 may generate the historic information based at least in part on generating statistics (e.g., averages, means, maximums, and/or medians) for any combination of multiple preferred beams, reference signals associated with the multiple preferred beams, UE locations, UE movement patterns, directions, signal quality metrics, and/or other UE operating conditions to identify, for a particular UE location, which beam(s) are used more frequently to transmit RACH relative to other beams. For example, for the particular UE location, the network node 110 may associate the beam (and/or reference signal carried by the beam) most selected by the multiple prior UEs relative to other beams with the particular UE location. The selection of a reference signal may implicitly indicate selection of the beam that carries the reference signal (or vice versa). In generating the historic information, the network node 110 may associate one or more operating conditions with the selected beam, such as a UE movement pattern, a direction, a signal metric, and/or a location. Alternatively, or additionally, the network node 110 may generate a respective statistic and/or respective probability for each beam (and/or reference signal carried by the beam) that indicates a probability and/or rate associated with how often the beam was selected by prior UE(s). The network node 110 may associate the respective statistic and/or respective probability with any combination of operating conditions as described above.

While the network node 110 may generate the historic information, other examples may include the network node 110 forwarding the connection information (e.g., any combination of a selected beam, a selected reference signal, and/or an associated operating condition) to a core network, and the core network may generate the historic information. Accordingly, the network node 110 may obtain the historic information from the core network. To illustrate, the network node 110 may transmit a request for the historic information, and the core network may return the historic information based at least in part on receiving the request. In some aspects, the core network may obtain connection information from multiple network nodes.

Accordingly, the core network node may generate the historic information based at least in part on generating statistics as described above using information from the multiple network nodes. Alternatively, or additionally, the network node 110 may obtain the historic information from a file stored in memory at the network node 110.

In some aspects, the historic information may indicate one or more reference signals for a combination of locations. To illustrate, the historic information may indicate a first reference signal subset that is associated with a first location, a second reference signal subset that is associated with a second location, and/or a third reference signal subset that is associated with a third location. Each reference signal subset may include one or more reference signals of a set of reference signals. As one example, the set of reference signals may be a set of SSBs, and the reference signal subset may include one or more SSBs from the set of SSBs. The network node 110 may transmit each reference signal in the set of reference signals using a respective beam that has a respective propagation direction. For instance, the set of beams used to transmit the set of reference signals may have respective propagation directions that, collectively, provide approximately 360° of beam coverage (e.g., in a horizontal plane) about the network node 110.

The historic information may indicate a reference signal subset that includes one or more reference signals, and the reference signal subset may be associated with a particular location and/or a particular direction. Accordingly, the one or more respective beams associated with the reference signals may be configured with a respective propagation path that is towards and/or near the particular location and/or along the particular direction (e.g., within a threshold and/or within a range of values). However, the historic information may associate a reference signal subset with other operating conditions, such as a signal metric and/or a preferred beam.

In some aspects, the historic information may indicate a machine learning algorithm configuration that forms a machine learning algorithm that selects a reference signal subset. To illustrate, the network node 110 and/or a core network may train a machine learning algorithm based at least in part on any combination of connection information from prior UEs (e.g., a preferred beam, a preferred reference signal, a signal quality metric, a UE location, a UE movement pattern, a direction, and/or other UE operating conditions). That is, the network node 110 and/or the core network node may train the machine learning algorithm to predict a preferred reference signal subset based at least in part on a variety of inputs as described above, and extract a machine learning algorithm configuration from the (trained) machine learning algorithm. Some non-limiting examples of a machine learning algorithm configuration may include a number of layers, connected layers, a node computation type, a node weight, and/or a node bias.

As shown by reference number 420, the network node 110 and a UE 120 may establish a connection. To illustrate, the UE 120 may power up in a cell coverage area provided by the network node 110, and the UE 120 and the network node 110 may perform one or more procedures (e.g., a RACH procedure and/or an RRC procedure) to establish a wireless connection. Alternatively, or additionally, the UE 120 may move into the cell coverage area provided by the network node 110, and may perform a handover from a source network node (e.g., another network node 110) to the network node 110.

As shown by reference number 430, the UE 120 may transmit and/or indicate a request for reference signal information. As one example, the UE 120 may indicate a request for reference signal subset(s) that are based at least in part on one or more operating conditions as described above. In some aspects, the UE 120 may transmit the request based at least in part on operating in an RRC connected state and/or having an active connection to the network node 110. While the example 400 includes the UE 120 transmitting and/or indicating a request for the reference signal information, other examples may include the UE 120 not transmitting and/or not indicating the request for the reference signal information.

Alternatively, or additionally, the UE 120 may transmit and/or indicate UE-specific information to the network node 110. As one example, the UE 120 may generate one or more signal metrics based at least in part on measuring the set of reference signals, and select a preferred reference signal from the set of reference signals. To illustrate, the UE 120 may select a preferred reference signal based at least in part on a respective signal quality metric, such as by selecting a reference signal that has the highest RSSI, the highest RSRP, and/or the highest signal-to-noise ratio (SNR) out of the set of reference signals. In some aspects, the UE 120 may transmit an indication of the preferred reference signal to the network node 110. Alternatively, or additionally, the UE 120 may indicate location information, such as location information obtained by the UE 120 based at least in part on a global network satellite system (GNSS), a global positioning system (GPS), and/or other types of positioning systems. Other examples of UE-specific information may include a movement pattern and/or direction, such as a speed, direction, and/or velocity. The UE 120 may periodically indicate location updates, movement pattern updates, preferred reference signal updates, or indicate the updates based at least in part on receiving a request from the network node 110.

As shown by reference number 440, the network node 110 may select, as the reference signal information, one or more reference signal subsets that include one or more reference signals from a set of reference signals. As one example, a reference signal subset may indicate a subset of SSBs from a set of SSBs as described above. In some aspects, the network node 110 may select the reference signal subset(s) based at least in part on historic information and/or an operating condition (e.g., a location, a movement pattern, a direction, a distance, a signal metric, and/or a preferred reference signal) of the UE 120. As one example, the network node 110 may select one or more reference signal subsets based at least in part on a preferred reference signal indicated by the UE 120. Alternatively, or additionally, the network node 110 may select a reference signal subset that includes reference signal(s) associated with beams that have a propagation direction within a direction threshold of a beam that carries the preferred reference signal. The network node 110 may select one or more reference signal subsets based at least in part on historic information that indicates one or more reference signals selected by prior UEs at commensurate locations as the UE 120 (e.g., locations that are within a distance threshold and/or within a same range of values as the location of the UE 120).

In some aspects, the network node 110 may select reference signal subset(s) based at least in part on a movement pattern associated with the UE 120. To illustrate, the network node 110 may select the reference signal subset(s) based at least in part on historic information that indicates one or more reference signals selected by prior UE(s) with commensurate movement patterns, commensurate speeds (e.g., within a speed threshold), and/or commensurate directions (e.g., within the direction threshold) as the UE 120. Alternatively, or additionally, the network node 110 may select the reference signal subset(s) for different validity time windows as described below with regard to FIG. 5B. To illustrate, the network node 110 may select a first reference signal subset that is associated with a first validity time window of 10 seconds, a second reference signal subset that is associated with a second validity time window of 20 seconds, and/or a third reference signal subset that is associated with a third validity time window of 30 seconds. The validity time window may be based at least in part on a distance, may indicate a time span that the respective reference signal subset is valid and/or applicable to the UE 120, and/or may indicate a time at which the respective reference signal subset is no longer valid and/or no longer applicable to the UE 120.

In some aspects, the network node 110 may select reference signal subset(s) based at least in part on one or more anchor locations. "Anchor location" may denote a fixed location. To illustrate, for a first region of a coverage area, the network 110 may select a first anchor location within the first region, such as a center location of the first region, a boundary location of the first region, and/or a city center location within the first region. In some aspects, the network node 110 may select a reference signal subset based at least in part on an anchor location and historic information that indicates one or more reference signals used by prior UE(s) that were associated with the anchor location, such as a first prior UE operating at the anchor location, a second prior UE operating within the region associated with the anchor location, and/or a third prior UE operating within a threshold distance of the anchor location. Accordingly, the reference signal information may indicate one or more anchor locations, and each anchor location may be associated with a respective reference signal subset of one or more reference signal subsets indicated by the reference signal information. Each respective reference signal subset may include one or more different reference signals relative to the other reference signal subsets.

The network node 110 may select one or more reference signal subsets based at least in part on a movement pattern (e.g., a potential movement pattern or a UE reported movement pattern). To illustrate, the network node 110 may select a West reference signal subset that is associated with a West direction, an East reference signal subset that is associated with an East direction, a North reference signal subset that is associated with a North direction, and/or a South reference signal subset that is associated with a South direction. In some aspects, the network node 110 may select one of the directional reference signal subsets based at least in part on a UE reported movement pattern indicating the UE is moving in that direction. In other aspects, the network node 110 may select a variety of potential directions and, subsequently, directional reference signal subsets, without receiving the UE reported movement pattern and/or UE reported direction information. The West reference signal subset, the East reference signal subset, the North reference signal subset, and/or the South reference signal subset may be associated with a same validity time window and/or different validity time windows. The network node 110 may use any number of directions that are partitioned into any span. To illustrate, 360° in a horizontal plane may be partitioned into four equal direction partitions or eight equal direction partitions, each direction partition may have a respective coverage area size (e.g., 90° or 45°), and/or each direction partition may be associated with a respective direction.

Alternatively, or additionally, the network node 110 may select, as the reference signal information, a machine learning algorithm configuration that forms a machine learning algorithm that selects one or more reference signal subsets. To illustrate, the network 110 may select a first machine learning algorithm configuration based at least in part on a preferred reference signal indicated by the UE 120, a second machine learning algorithm configuration based at least in part on an anchor location, and/or a third machine learning algorithm configuration based at least in part on any combination of a velocity, speed, and/or direction associated with the UE 120. As described above, the network node 110 may obtain the machine learning algorithm configuration from a core network and/or based at least in part on training the machine learning algorithm using the historic information.

As shown by reference number 450, the network node 110 may transmit, and the UE 120 may receive, reference signal information. As one example, the network node 110 may transmit reference signal information specific to the UE 120 (e.g., UE-specific reference signal information) to the UE 120 in RRC signaling and/or based at least in part on receiving a request from the UE 120. However, while the example 400 includes the network node 110 transmitting the reference signal information based at least in part on a request from the UE 120, other examples may include the network node 110 autonomously transmitting the reference signal information (e.g., without receiving a request for the reference signal information from the UE 120). To illustrate, the network node 110 may transmit the reference signal information in a broadcast message and/or a system information block (SIB).

As described above, the reference signal information may indicate one or more reference signal subsets (e.g., a subset of SSBs from a set of SSBs) and/or one or more machine learning algorithm configurations. In some aspects, the network node 110 may transmit different reference signal information based at least in part on a beam propagation direction that is carrying the reference signal information. To illustrate, the network node 110 may transmit first reference signal information (e.g., that indicates a first reference signal subset) based at least in part on using a first beam that propagates in a first direction, and second reference signal information (e.g., that indicates a second reference signal subset) based at least in part on using a second beam that propagates in a second direction. Accordingly, the first reference signal subset may be based at least in part on the first beam (e.g., a first subset of SSBs and/or beams with a commensurate propagation direction as the first beam), and the second reference signal subset may be based at least in part on the second beam (e.g., a second subset of SSBs and/or beams with a commensurate propagation direction as the second beam).

In some aspects, the network node 110 may indicate, as at least part of the reference signal information, a respective probability for each reference signal included in the reference signal subset(s), such as a probability and/or statistic associated with a respective reference signal and/or beam carrying the respective reference signal. The probability and/or statistic may indicate a probability the reference signal and/or beam will satisfy one or more transmission conditions (e.g., a signal quality metric) for the UE 120. Alternatively, or additionally, the probability and/or statistic may indicate a percentage and/or rate associated with how often the respective reference signal and/or beam was selected by prior UE(s). In some aspects, the respective statistic and/or respective probability may be based at least in part on any combination of a location, a movement pattern, and/or a direction (e.g., potential or reported by the UE).

The reference signal information may indicate a probability ranking for each reference signal included in each reference signal subset. To illustrate, the network node 110 may list each reference signal in a reference signal subset using an ordering that is based at least in part on a respective probability value associated with each reference signal, such as by listing the subset of reference signals from highest probability to lowest probability (or vice versa). A reference signal listed in a first position of the list may have a highest probability ranking within the reference signal subset, and/or a reference signal listed in a last position of the list may have a lowest probability ranking within the reference signal subset. Accordingly, the network node 110 may indicate a probability ranking of the reference signals within a reference signal subset, either with or without specifying a probability value and/or a statistic value.

As described above, each reference signal subset of the one or more reference signal subsets within the reference signal information may be based at least in part on a preferred reference signal selected and/or indicated by the UE 120. Alternatively, or additionally, one or more reference signal subsets indicated by the reference signal information may be associated with a respective validity time window. Each validity time window may be based at least in part on any combination of operating conditions, such as a direction, a distance, a speed, a location, and/or a velocity. To illustrate, the network node 110 may select a first reference signal subset that is associated with a first validity time window based at least in part on an anchor location, a direction (e.g., a potential direction and/or a UE reported direction), a speed (e.g., a potential speed and/or a UE reported speed), and/or a velocity (e.g., a potential velocity and/or a UE reported velocity). The network node 110 may also select a second reference signal subset that is associated with a second validity time window (e.g., a longer or shorter duration) based at least in part on the anchor location, the direction, the speed, and/or the velocity.

In some aspects, the reference signal information may indicate a machine learning algorithm configuration that may be used by the UE 120 to form a machine learning algorithm that selects a reference signal subset. The formed machine learning algorithm may select the reference signal subset based at least in part on input that includes a signal metric and/or an operating condition of the UE 120.

As shown by reference number 460, the UE 120 may select a reference signal subset that is indicated by the reference signal information. To illustrate, the UE 120 may select the reference signal subset based at least in part on an operating condition of the UE 120, such as a signal metric, a direction, a location, a speed, and/or a velocity. To illustrate, the UE 120 may obtain a UE location using GPS, GNSS, and/or a different positioning service. The UE 120 may compare the UE location to one or more anchor locations indicated by the reference signal information and select an anchor location that is within a distance threshold of the UE location and/or is closest to the UE location relative to other anchor locations. The UE 120 may then select the reference signal subset that is associated with the (selected) anchor location.

Alternatively, or additionally, the reference signal information may indicate one or more potential directions and/or movement patterns for each reference signal subset. The UE 120 may identify a movement pattern and/or a direction of movement (e.g., of the UE 120) and select, as the reference signal subset, a reference signal subset that is associated with a potential direction and/or potential movement pattern that is commensurate with the UE movement pattern and/or direction of movement. In some aspects, one or more reference signal subsets indicated by the reference signal information may be associated with a respective validity time window, and the UE 120 may select a reference signal subset based at least in part on the validity time window. For example, the UE 120 may determine to select a reference signal subset with a longer validity time window based at least in part on a velocity of the UE 120 and/or an anticipated location of the UE 120 for the duration of the validity time window.

In some aspects, the UE 120 may select a machine learning algorithm configuration based at least in part on a signal metric and/or an operating condition of the UE 120 as described above. Accordingly, the UE 120 may form a machine learning algorithm using the machine-learning algorithm configuration. Alternatively, or additionally, the UE 120 may select a reference signal subset based at least in part on using the machine learning algorithm. To illustrate, the UE 120 may input one or more signal metrics associated with reference signals and/or one or more operating conditions into the machine learning algorithm may output a prediction of a subset of reference signals (e.g., a subset of SSBs from the set of SSBs).

As shown by reference number 470, the UE 120 may perform a measurement procedure based at least in part on the reference signal information. To illustrate, the UE 120 may perform the measurement procedure based at least in part on using a selected reference signal subset. For example, and as part of the measurement procedure, the UE 120 may calculate a respective signal metric for each reference signal of the set of reference signals that is included in the reference signal subset. That is, as part of the measurement procedure, the UE 120 may select to only calculate the respective signal metric for each reference signal in the reference signal subset. Alternatively, or additionally, as part of the measurement procedure, the UE 120 may refrain from generating a signal metric for at least one reference signal from the set of reference signals that is excluded from the reference signal subset.

In some aspects, the UE 120 may perform the measurement procedure while operating in an RRC idle state or an RRC inactive state. That is, the UE 120 may obtain the reference signal information based at least in part on operating in an RRC connected state, and/or may use the reference signal information to select a reference signal subset while operating in the RRC idle state and/or the RRC inactive state. To illustrate, the UE 120 may perform the measurement procedure while operating in the RRC idle state to identify an SSB (and a corresponding beam carrying the SSB) with better signal quality relative to the other SSBs in the reference signal subset, and monitor CSS PDCCH using the selected SSB. As another example, the UE may perform the measurement procedure while operating in the RRC inactive move to identify an SSB (and a corresponding beam carrying the SSB) with better signal quality relative to the other SSBs in the reference signal subset, and monitor for an SDT via a corresponding configured grant occasion and/or for a RACH occasion based at least in part on the selected SSB. Accordingly, the UE 120 may preserve a battery life of a battery at the UE 120 while operating in the RRC idle state and/or RRC inactive state by reducing a number of reference signal monitored and/or measured by the UE 120. That is, the UE 120 may monitor a subset of reference signals that historic information indicates are likely to satisfy a transmission condition at the UE.

In some aspects, and as part of performing the measurement procedure, the UE 120 may determine that the respective signal metric for each reference signal in the reference signal subset fails to satisfy a signal quality threshold. Accordingly, the UE 120 may re-perform the measurement procedure based at least in part on calculating a signal metric for each reference signal in the (full) set of reference signals. In some aspects, the UE 120 may transmit an error indication (e.g., to the network node 110) that indicates the signal metrics for each reference signal in the reference signal subset fails to satisfy the signal quality threshold.

A reference signal subset that is based at least in part on historic information may enable a UE to leverage information from other UEs and reduce a number of reference signals (e.g., SSBs) measured and/or evaluated by the UE. The UE may identify a best reference signal (and associated beam) from a subset of reference signals, rather than the full set of reference signals, based at least in part on historic information that indicates reference signals and/or beams that have been selected by other UEs with similar operating condition(s). Leveraging the information may enable the UE to maintain a signal quality for communications between the UE and the network node, reduce the complexity of operations performed by the UE, and preserve a battery life of the UE.

As indicated above, FIG. 4 is provided as an example. Other examples may differ from what is described with regard to FIG. 4.

FIGS. 5A, 5B, and 5C are diagrams illustrating a first example 500, a second example 502, and a third example 504 of reference signal information, in accordance with the present disclosure.

The first example 500 shown by FIG. 5A is an example of reference signal information that may be based at least in part on one or more anchor locations. As described above, an anchor location may be a fixed location selected by a network node and/or may be associated with a respective location within a coverage area provided by the network node. In the first example 500, the reference signal information is sorted into columns and rows of a table. A first column 506, that is shown in FIG. 5A as anchor location (x, y, z), may specify anchor location information as described below, and a second column 508 (shown as reference signal (RS) subset identifiers (IDs)) may specify reference signal subsets, such as by specifying the IDs of the reference signals included in the reference signal subset.

Each row of the table specifies an association between an anchor location and a reference signal subset. To illustrate, in the first example 500, each anchor location is characterized by three dimensional (3D) Cartesian coordinates associated with an x-axis, a y-axis, and a z-axis. Accordingly, a first row 510 includes a first anchor location (shown as x1, y1, z1) within the first column 506, and a first reference signal subset (shown as 1, 2, 3) in the second column 508. That is, the first reference signal subset may include a first reference signal with an ID of "1", a second reference signal with an ID of "2", and a third reference signal with an ID of "3". The association of the first reference signal subset to the first anchor location may be based at least in part on historic information as described above. A second row 512 includes a second anchor location (shown as x2, y2, z2) within the first column 506 that is associated with a second reference signal subset (shown as 2, 3, 4) within the second column 508. In a similar manner as the first reference signal subset being associated with the first anchor location, the second reference signal subset may be associated with the second anchor location based at least in part on historic information. As shown by FIG. 5A, the reference signals included in a reference signal subset may be indicated in reference signal information based at least in part on respective IDs of each reference signal. Alternatively, or additionally, the combination of specific reference signals that are included in a reference signal subset may be RRC configured, and the reference signal information may indicate selection of a particular RRC configured reference signal subset (e.g., by indicating an ID of the RRC configured reference signal subset). In some aspects, the reference signal information may indicate a priority ranking of the reference signals included in a reference signal subset as described above.

Alternatively, or additionally, the reference signal information may indicate a priority and/or statistic of each reference signal within the reference signal information.

In some aspects, a UE may select a reference signal subset from the reference signal information described by the first example 500 based at least in part on obtaining a UE location (e.g., through a positioning service). For instance, the UE may analyze the reference signal information to identify an anchor location that is closest to the UE location and/or an anchor location that satisfies a distance threshold from the UE location. As one example, the UE may determine that the second anchor location included in the second row 512 may be the closest anchor location to the UE out of all the anchor locations included in the reference signal information. Accordingly, the UE may select the second reference signal subset in the second row 512 and the second column 508 as the subset of reference signals to use in a measurement procedure. Alternatively, or additionally, the UE may generate signal metrics for reference signals based at least in part on probability information, such as by only measuring two reference signals with the highest probabilities within the reference signal subset and/or by measuring the top two ranked reference signals.

The second example 502 shown by FIG. 5B is an example of reference signal information that may be based at least in part on a best reference signal (e.g., a reference signal with the highest signal metric out of a set of reference signals and/or a UE preferred reference signal). The reference signal information included in the second example 502 may also be based at least in part on one or more distances. A network node may generate the reference signal information shown by the second example 502 based at least in part on historic information, with input from a UE, and/or without input from a UE. For instance, the network node may receive an indication of a preferred reference signal from the UE, and generate the reference signal information in the second example 502 by selecting one or more reference signal subsets that the historic information indicates are associated with the preferred reference signal. As another example, the network node may generate the reference signal information using one or more potential preferred reference signals (e.g., not indicated by the UE), such as by selecting preferred reference signals that the historic information indicates are associated with a UE location. Accordingly, the network node may generate the reference signal information by selecting one or more reference signal subsets that the historic information indicates are associated with the potential preferred reference signal(s).

In the second example 502, the reference signal information is sorted into columns and rows of a table. A first column 514 (shown as best RS ID) may specify an ID of a best reference signal (e.g., a preferred reference signal selected by a UE and/or a potential preferred reference signal selected by a network node). A second column 516 (shown as First Distance RS IDs) may specify a first reference signal subset that is associated with a first distance (e.g., 10 meters), and a third column 518 (shown as Second Distance RS IDs) may specify a second reference signal subset that is associated with a second distance (e.g., 20 meters). Each row of the table may indicate an association between a best reference signal, a first reference signal subset associated with the first distance, and a second reference signal subset associated with the second distance.

To illustrate, in the second example 502, a row 520 specifies a first best reference signal with an ID of "1" within the first column 514. The first best reference signal may be associated with a first reference signal subset (shown as including reference signals 1, 2, 3) within the second column 516. The first reference signal subset may be associated with a first distance and/or a validity time window. For example, the reference signal information may indicate that the first reference signal subset is valid for UE movement within the first distance and/or that the first reference signal subset is invalid for UE movement outside the first distance. The first best reference signal may be associated with a second reference signal subset (shown as 5, 9, 2) within the third column 518. The reference signal information may indicate that the second reference signal subset is valid for UE movement between the first distance and the second distance and/or that the second reference signal subset is invalid for UE movement outside the second distance and/or within the first distance.

In some aspects, the distances may alternatively or additionally indicate a validity time window, such as a validity time window that is based at least in part on an amount of time for the UE to travel an indicated distance. That is, the validity time window may be based at least in part on a speed of the UE, a direction of the UE, and/or a movement pattern of the UE. Accordingly, each distance associated with a reference signal subset may indicate a validity time window. As shown by FIG. 5B, the reference signals included in a reference signal subset may be indicated in reference signal information based at least in part on respective IDs of each reference signal. Alternatively, or additionally, the combination of specific reference signals that are included in a reference signal subset may be RRC configured as described above. In some aspects, the reference signal information may indicate a priority ranking of the reference signals included in a reference signal subset as described above. Alternatively, or additionally, the reference signal information may indicate a priority and/or statistic of each reference signal within the reference signal information.

A UE may select a reference signal subset from the reference signal information in the second example 502 based at least in part on a signal metric that indicates which of reference signals indicated by the reference signal information has the highest signal quality. For example, the UE may select the reference signal subset from a row that indicates a reference signal ID associated with a preferred reference signal selected by the UE. Alternatively, or additionally, the UE may select a reference signal subset from the reference signal information in the second example 502 based at least in part on other operating conditions, such as a speed of the UE and/or a velocity of the UE. In some aspects, the UE may select the reference signal subset based at least in part on a distance and/or validity time window associated with the reference signal subset. While the reference signal information of example 502 includes a table with two distances and three best reference signals, other examples may more or fewer best reference signals as well as more or fewer distances.

The third example 504 shown by FIG. 5C is an example of reference signal information that may be based at least in part on one or more directions and/or one or more movement patterns. A network node may generate the reference signal information shown by the third example 504 based at least in part on historic information, with input from a UE, and/or without input from a UE. As one example, the network node may receive an indication of a movement pattern from the UE, and generate the reference signal information in the third example 504 based at least in part on one or more potential movement directions of the UE and historic information that indicates reference signal subsets associated with the potential movement direction(s). As another example, the network node may generate the reference signal information based at least in part on the historic information and without receiving an indication of a movement pattern from the UE, such as by selecting potential movement directions without input from the UE.

In the third example 504, the reference signal information is sorted into columns and rows of a table. A first column 522 (shown as best RS ID) may specify an ID of a best reference signal as described above. A second column 524 (shown as First Direction RS IDs) may specify a first reference signal subset that is associated with a first direction (e.g., a first direction partition), and a third column 526 (shown as Second Direction RS IDs) may specify a second reference signal subset that is associated with a second direction (e.g., a second direction partition). While the third example 504 shows two directions and/or two direction partitions, other examples may include more directions. Each row of the table specifies an association between a best RS, a first reference signal subset that is associated with the first direction, and a second reference signal subset that is associated with the second direction.

To illustrate, in the reference signal information included in the third example 504, a row 528 specifies a first best reference signal with an ID of "1" within the first column 522. For the first direction, the first best reference signal may be associated with a first reference signal subset (shown as reference signals with IDs of 1, 2, 3) within the first column 522. For the second direction, the first best reference signal may be associated with a second reference signal subset (shown as reference signals with IDs of 3, 4, 5) within the third column 526. As shown by FIG. 5C, the reference signals included in a reference signal subset may be indicated in reference signal information based at least in part on respective IDs of each reference signal. Alternatively, or additionally, the combination of specific reference signals that are included in a reference signal subset may be RRC configured as described above. In some aspects, the reference signal information may indicate a priority ranking of the reference signals included in a reference signal subset as described above. Alternatively, or additionally, the reference signal information may indicate a priority and/or statistic of each reference signal within the reference signal information. While the reference signal information of third example 504 includes two directions and three best reference signals, other examples may include more or fewer best reference signals, as well as more or fewer directions.

A UE may select a reference signal subset from the reference signal information in the third example 504 based at least in part on a movement pattern of the UE and/or a preferred reference signal. To illustrate, the UE may determine that a reference signal with an ID of "1" is a preferred reference signal. Based at least in part on a future movement direction associated with the second direction of the third column 526, the UE may use the second reference signal subset in the row 528 and the third column 526 as the reference signal subset to use when performing a measurement procedure.

A reference signal subset that is based at least in part on historic information may enable a UE to leverage information from other UEs and reduce a number of reference signals (e.g., SSBs) measured and/or evaluated by the UE. The UE may identify a best reference signal (and associated beam) from a subset of reference signals, rather than the full set of reference signals, based at least in part on historic information that indicates reference signals and/or beams that have been selected by other UEs with similar operating condition(s). Leveraging the information may enable the UE to maintain a signal quality for communications between the UE and the network node, reduce the complexity of operations performed by the UE, and preserve a battery life of the UE.

As indicated above, FIGS. 5A, 5B, and 5C are provided as examples. Other examples may differ from what is described with regard to FIGS. 5A, 5B, and 5C.

FIG. 6 is a diagram illustrating an example process 600 performed, for example, by a UE, in accordance with the present disclosure. Example process 600 is an example where the UE (e.g., UE 120) performs operations associated with measuring a subset of reference signals.

As shown in FIG. 6, in some aspects, process 600 may include receiving reference signal information that indicates one or more reference signal subsets that are based at least in part on a set of reference signals, each reference signal subset of the one or more reference signal subsets being based at least in part on historic information associated with the set of reference signals (block 610). For example, the UE (e.g., using reception component 802 and/or communication manager 806, depicted in FIG. 8) may receive reference signal information that indicates one or more reference signal subsets that are based at least in part on a set of reference signals, each reference signal subset of the one or more reference signal subsets being based at least in part on historic information associated with the set of reference signals, as described above.

As further shown in FIG. 6, in some aspects, process 600 may include selecting a reference signal subset from the one or more reference signal subsets based at least in part on an operating condition of the UE (block 620). For example, the UE (e.g., using communication manager 806, depicted in FIG. 8) may select a reference signal subset from the one or more reference signal subsets based at least in part on an operating condition of the UE, as described above.

As further shown in FIG. 6, in some aspects, process 600 may include performing a measurement procedure based at least in part on the reference signal subset (block 630). For example, the UE (e.g., using communication manager 806, depicted in FIG. 8) may perform a measurement procedure based at least in part on the reference signal subset, as described above.

Process 600 may include additional aspects, such as any single aspect or any combination of aspects described below and/or in connection with one or more other processes described elsewhere herein.

In a first aspect, receiving the reference signal information includes receiving the reference signal information in a broadcast message.

In a second aspect, process 600 includes transmitting a request for the reference signal information, and receiving the reference signal information includes receiving the reference signal information as a response to the request.

In a third aspect, transmitting the request is based at least in part on operating in an RRC connected state, and process 600 includes performing the measurement procedure while operating in an RRC idle state or an RRC inactive state.

In a fourth aspect, the operating condition includes at least one of an operating location associated with the UE, or a reference signal in the set of reference signals that satisfies a quality metric.

In a fifth aspect, performing the measurement procedure based at least in part on the reference signal subset includes calculating a respective signal metric for each reference signal of the set of reference signals that is included in the reference signal subset.

In a sixth aspect, performing the measurement procedure based at least in part on the reference signal subset includes refraining from generating a signal metric for at least one reference signal from the set of reference signals that is excluded from the reference signal subset.

In a seventh aspect, the respective signal metric for each reference signal in the reference signal subset is a first respective signal metric, and process 600 includes determining that the first respective signal metric for each reference signal in the reference signal subset fails to satisfy a signal quality threshold, and calculating a second respective signal metric for each reference signal in the set of reference signals.

In an eighth aspect, process 600 includes transmitting an error indication based at least in part on determining that the first respective signal metric for each reference signal in the reference signal subset fails to satisfy the signal quality threshold.

In a ninth aspect, process 600 includes selecting to only calculate the respective signal metric for each reference signal in the reference signal subset.

In a tenth aspect, the reference signal information indicates one or more anchor locations, and each anchor location of the one or more anchor locations is associated with a respective reference signal subset of the one or more reference signal subsets.

In an eleventh aspect, the operating condition of the UE includes a location of the UE, selecting the reference signal subset includes identifying an anchor location of the one or more anchor locations that is within a distance threshold of the location, and selecting the reference signal subset based at least in part on the anchor location.

In a twelfth aspect, the reference signal information indicates a respective probability for each reference signal included in each reference signal group.

In a thirteenth aspect, the reference signal information indicates a probability ranking for each reference signal included in each reference signal subset.

In a fourteenth aspect, process 600 includes selecting a preferred reference signal from the set of reference signals based at least in part on a signal quality metric, and transmitting an indication of the preferred reference signal. In some aspects, the reference signal information is based at least in part on the preferred reference signal.

In a fifteenth aspect, each reference signal subset of the one or more reference signal subsets is based at least in part on the preferred reference signal.

In a sixteenth aspect, the one or more reference signal subsets are associated with a validity time window.

In a seventeenth aspect, the validity time window is based at least in part on at least one of a distance, a speed, or a velocity.

In an eighteenth aspect, a first reference signal subset of the one or more reference signal subsets is associated with a first direction, and a second reference signal subset of the one or more reference signal subsets is associated with a second direction.

In a nineteenth aspect, the operating condition includes a movement of the UE, and process 600 includes selecting, as the reference signal subset, the first reference signal subset based at least in part on the movement.

In a twentieth aspect, process 600 includes transmitting an indication of a movement pattern of the UE, and the reference signal information is based at least in part on the movement pattern.

In a twenty-first aspect, receiving the reference signal information includes receiving an indication of a machine-learning algorithm configuration that is configured to enable the UE to select the reference signal subset.

In a twenty-second aspect, process 600 includes forming a machine-learning algorithm based at least in part on the machine-learning algorithm configuration, and selecting the reference signal subset includes selecting the reference signal subset based at least in part on using the machine-learning algorithm.

In a twenty-third aspect, the machine-learning algorithm is configured to select the reference signal subset based at least in part on at least one of a signal metric, or the operating condition of the UE.

In a twenty-fourth aspect, process 600 includes connecting to a network node, and receiving the reference signal information is based at least in part on connecting to the network node.

In a twenty-fifth aspect, the set of reference signals includes a set of synchronization signal blocks.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a network node, in accordance with the present disclosure. Example process 700 is an example where the network node (e.g., network node 110) performs operations associated with measuring a subset of reference signals.

As shown in FIG. 7, in some aspects, process 700 may include selecting, based at least in part on historic information associated with a set of reference signals and an operating condition associated with a UE, one or more reference signal subsets that are based at least in part on the set of reference signals (block 710). For example, the network node (e.g., using communication manager 906, depicted in FIG. 9) may select, based at least in part on historic information associated with a set of reference signals and an operating condition associated with a UE, one or more reference signal subsets that are based at least in part on the set of reference signals, as described above.

As further shown in FIG. 7, in some aspects, process 700 may include transmitting reference signal information that indicates the one or more reference signal subsets that are based at least in part on the set of reference signals (block 720). For example, the network node (e.g., using transmission component 904 and/or communication manager 906, depicted in FIG. 9) may transmit reference signal information that indicates the one or more reference signal subsets that are based at least in part on the set of reference signals, as described above.

Process 700 may include additional aspects, such as any single aspect or any combination of aspects described below and/or in connection with one or more other processes described elsewhere herein.

In a first aspect, transmitting the reference signal information includes transmitting the reference signal information in a broadcast message.

In a second aspect, process 700 includes receiving a request for the reference signal information, and transmitting the reference signal information includes transmitting the reference signal information as a response to the request.

In a third aspect, the operating condition includes at least one of an operating location associated with the UE, or a preferred reference signal in the set of reference signals.

In a fourth aspect, process 700 includes receiving an error indication that indicates that a respective signal metric for each reference signal in a reference signal subset of the one or more reference signal subsets fails to satisfy a signal quality threshold.

In a fifth aspect, transmitting the reference signal information includes transmitting the reference signal information in a system information block broadcast message.

In a sixth aspect, transmitting the reference signal information includes transmitting a first reference signal subset of the one or more reference signal subsets based at least in part on using a first beam associated with a first propagation direction, and transmitting a second reference signal subset of the one or more reference signal subsets based at least in part on using a second beam associated with a second propagation direction. In some aspects, the first propagation direction is different from the second propagation direction, the first reference signal subset includes a first combination of reference signals from the set of reference signals, and the second reference signal subset includes a second combination of reference signals from the set of reference signals.

In a seventh aspect, process 700 includes obtaining the historic information from a core network.

In an eighth aspect, the UE is a first UE, and process 700 includes generating the historic information based at least in part on a transmission associated with at least a second UE and a location of the at least second UE.

In a ninth aspect, the transmission is based at least in part on a preferred reference signal selected by the second UE.

In a tenth aspect, the transmission is a random access channel.

In an eleventh aspect, the UE is a first UE, and the historic information indicates a beam used by a second UE and a location of the second UE when the second UE is using the beam.

In a twelfth aspect, the reference signal information indicates one or more anchor locations, and each anchor location of the one or more anchor locations is associated with a respective reference signal subset of the one or more reference signal subsets.

In a thirteenth aspect, the reference signal information indicates a respective probability for each reference signal included in each reference signal subset.

In a fourteenth aspect, the reference signal information indicates a probability ranking for each reference signal included in each reference signal subset.

In a fifteenth aspect, process 700 includes receiving an indication of a preferred reference signal, and selecting the one or more reference signal subsets based at least in part on the preferred reference signal.

In a sixteenth aspect, the one or more reference signal subsets are associated with a validity time window.

In a seventeenth aspect, the validity time window is based at least in part on at least one of a distance, a speed, or a velocity.

In an eighteenth aspect, a first reference signal subset of the one or more reference signal subsets is associated with a first direction, and a second reference signal subset of the one or more reference signal subsets is associated with a second direction.

In a nineteenth aspect, process 700 includes receiving an indication of a UE movement pattern, and selecting the one or more reference signal subsets includes selecting the one or more reference signal subsets based at least in part on the UE movement pattern.

In a twentieth aspect, receiving the reference signal information includes transmitting an indication of a machine-learning algorithm configuration that is configured to enable the UE to select the reference signal subset.

In a twenty-first aspect, the machine-learning algorithm configuration is configured to enable the UE to select the reference signal subset based at least in part on at least one of a signal metric, or the operating condition of the UE.

In a twenty-second aspect, process 700 includes connecting to the UE, and transmitting the reference signal information is based at least in part on connecting to the UE.

In a twenty-third aspect, the set of reference signals includes a set of synchronization signal blocks.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
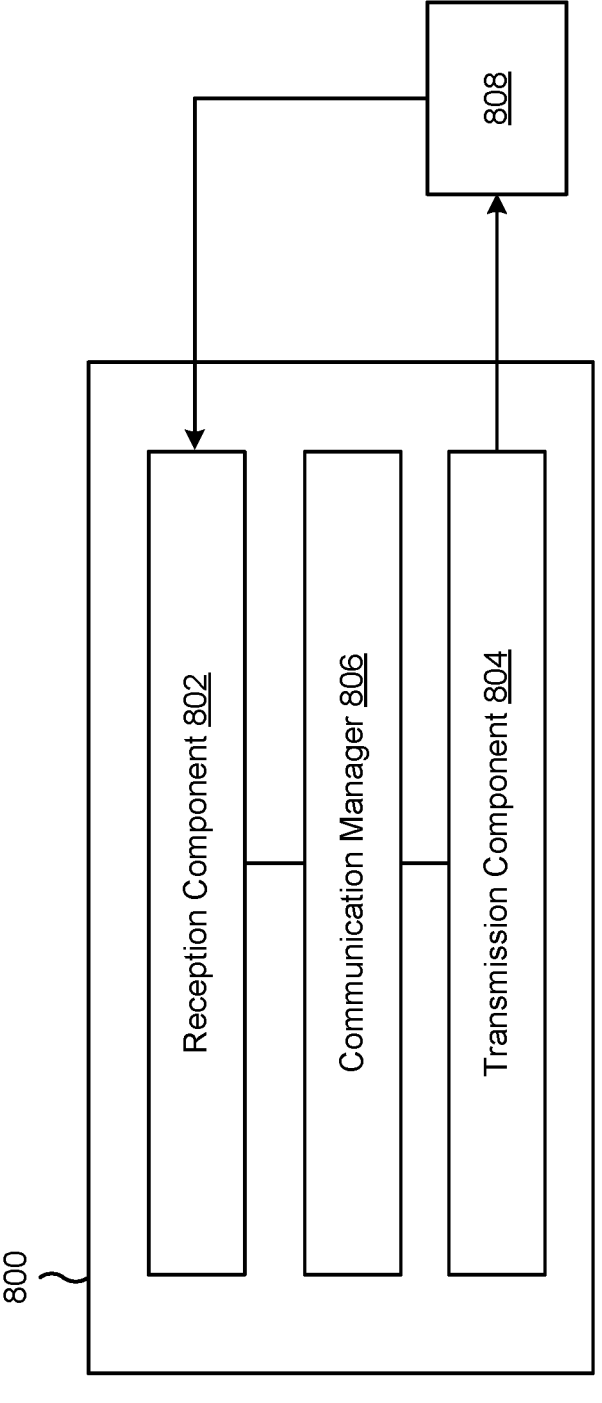
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802, a transmission component 804, and/or a communication manager 806, which may be in communication with one another (for example, via one or more buses and/or one or more other components). In some aspects, the communication manager 806 is the communication manager 140 described in connection with FIG. 1. As shown, the apparatus 800 may communicate with another apparatus 808, such as a UE or a network node (such as a CU, a DU, an RU, or a base station), using the reception component 802 and the transmission component 804.

In some aspects, the apparatus 800 may be configured to perform one or more operations described herein in connection with FIGS. 3-7. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 808. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 808. In some aspects, one or more other components of the apparatus 800 may generate communications and may provide the generated communications to the transmission component 804 for transmission to the apparatus 808. In some aspects, the transmission component 804 may perform signal processing on the generated communications (such as filtering, amplification, modulation, digitalto-analog conversion, multiplexing, interleaving, mapping, or encoding, among other examples), and may transmit the processed signals to the apparatus 808. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The communication manager 806 may support operations of the reception component 802 and/or the transmission component 804. For example, the communication manager 806 may receive information associated with configuring reception of communications by the reception component 802 and/or transmission of communications by the transmission component 804. Additionally, or alternatively, the communication manager 806 may generate and/or provide control information to the reception component 802 and/or the transmission component 804 to control reception and/or transmission of communications.

The reception component 802 may receive reference signal information that indicates one or more reference signal subsets that are based at least in part on a set of reference signals, each reference signal subset of the one or more reference signal subsets being based at least in part on historic information associated with the set of reference signals. The communication manager 806 may select a reference signal subset from the one or more reference signal subsets based at least in part on an operating condition of the UE. The communication manager 806 may perform a measurement procedure based at least in part on the reference signal subset.

The communication manager 806 may transmit, by way of the transmission component 804, a request for the reference signal information.

The communication manager 806 may transmit, by way of the transmission component 804, an error indication based at least in part on determining that the first respective signal metric for each reference signal in the reference signal subset fails to satisfy the signal quality threshold.

The communication manager 806 may select to only calculate the respective signal metric for each reference signal in the reference signal subset.

The communication manager 806 may select a preferred reference signal from the set of reference signals based at least in part on a signal quality metric.

The communication manager 806 may transmit, by way of the transmission component 804, an indication of the preferred reference signal, and the reference signal information is based at least in part on the preferred reference signal.

The communication manager 806 may transmit, by way of the transmission component 804, an indication of a movement pattern of the UE, and the reference signal information is based at least in part on the movement pattern.

The communication manager 806 may form a machine-learning algorithm based at least in part on the machine-learning algorithm configuration.

The communication manager 806 may connect to a network node and receiving the reference signal information is based at least in part on connecting to the network node.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
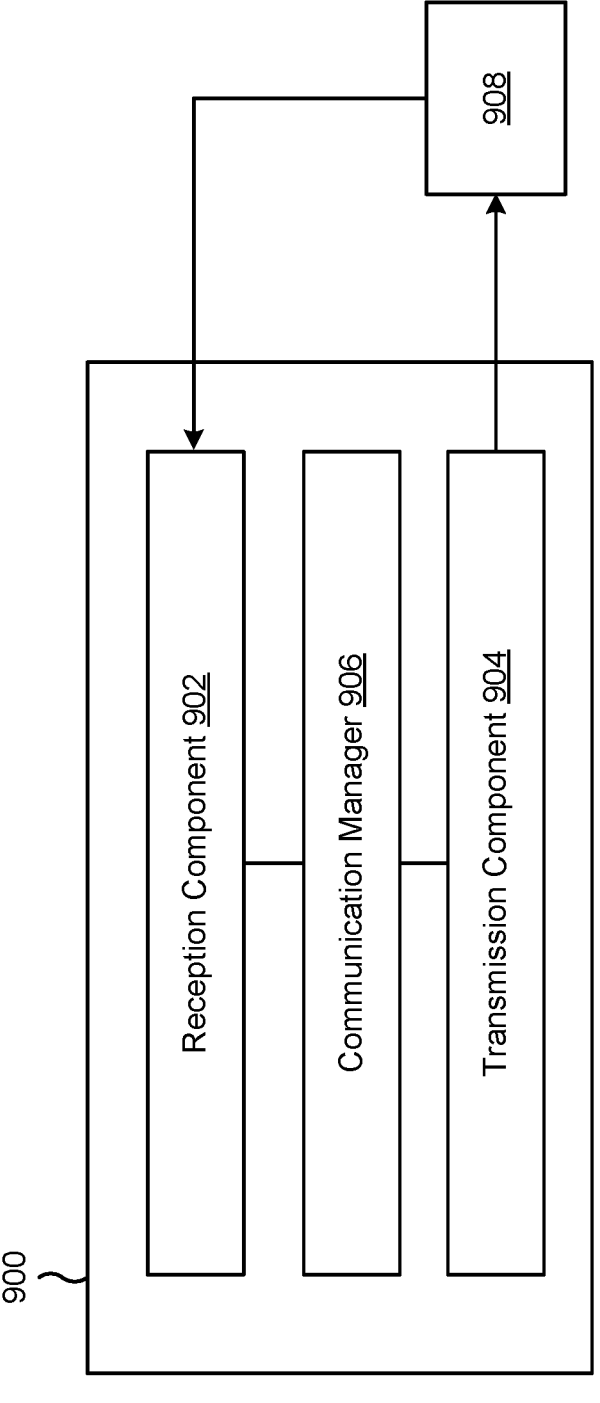
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node, or a network node may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 150 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 3-7. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node described in connection with FIG. 2. In some aspects, the reception component 902 and/or the transmission component 904 may include or may be included in a network interface. The network interface may be configured to obtain and/or output signals for the apparatus 900 via one or more communications links, such as a backhaul link, a midhaul link, and/or a fronthaul link.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, a modem, a modulator, a transmit MIMO processor, a transmit processor, a controller/processor, a memory, or a combination thereof, of the network node described in connection with FIG. 2. In some aspects, the transmission component 904 may be co-located with the reception component 902 in a transceiver.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The communication manager 906 may select, based at least in part on historic information associated with a set of reference signals and an operating condition associated with a UE, one or more reference signal subsets that are based at least in part on the set of reference signals. The transmission component 904 may transmit reference signal information that indicates the one or more reference signal subsets that are based at least in part on the set of reference signals.

The communication manager 906 may receive, by way of the reception component 902, a request for the reference signal information.

The communication manager 906 may receive, by way of the reception component 902, an error indication that indicates that a respective signal metric for each reference signal in a reference signal subset of the one or more reference signal subsets fails to satisfy a signal quality threshold.

The communication manager 906 may obtain, by way of the reception component 902, the historic information from a core network.

The communication manager 906 may receive, by way of the reception component 902, an indication of a preferred reference signal.

The communication manager 906 may select the one or more reference signal subsets based at least in part on the preferred reference signal.

The communication manager 906 may receive, by way of the reception component 902, an indication of a UE movement pattern.

The communication manager 906 may connect to the UE and transmitting the reference signal information is based at least in part on connecting to the UE.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving reference signal information that indicates one or more reference signal subsets that are based at least in part on a set of reference signals, each reference signal subset of the one or more reference signal subsets being based at least in part on historic information associated with the set of reference signals; selecting a reference signal subset from the one or more reference signal subsets based at least in part on an operating condition of the UE; and performing a measurement procedure based at least in part on the reference signal subset.

Aspect 2: The method of Aspect 1, wherein receiving the reference signal information comprises: receiving the reference signal information in a broadcast message.

Aspect 3: The method of any of Aspects 1-2, further comprising: transmitting a request for the reference signal information, wherein receiving the reference signal information comprises: receiving the reference signal information as a response to the request, wherein receiving the reference signal information comprises: receiving the reference signal information as a response to the request.

Aspect 4: The method of Aspect 3, wherein transmitting the request is based at least in part on operating in a radio resource control (RRC) connected state, and the method comprises: performing the measurement procedure while operating in an RRC idle state or an RRC inactive state.

Aspect 5: The method of any of Aspects 1-4, wherein the operating condition comprises at least one of: an operating location associated with the UE, or a reference signal in the set of reference signals that satisfies a quality metric.

Aspect 6: The method of any of Aspects 1-5, wherein performing the measurement procedure based at least in part on the reference signal subset comprises: calculating a respective signal metric for each reference signal of the set of reference signals that is included in the reference signal subset.

Aspect 7: The method of Aspect 6, wherein performing the measurement procedure based at least in part on the reference signal subset comprises: refraining from generating a signal metric for at least one reference signal from the set of reference signals that is excluded from the reference signal subset.

Aspect 8: The method of Aspect 7, wherein the respective signal metric for each reference signal in the reference signal subset is a first respective signal metric, and the method further comprises: determining that the first respective signal metric for each reference signal in the reference signal subset fails to satisfy a signal quality threshold; and calculating a second respective signal metric for each reference signal in the set of reference signals.

Aspect 9: The method of Aspect 8, further comprising: transmitting an error indication based at least in part on determining that the first respective signal metric for each reference signal in the reference signal subset fails to satisfy the signal quality threshold.

Aspect 10: The method of Aspect 7, further comprising: selecting to only calculate the respective signal metric for each reference signal in the reference signal subset.

Aspect 11: The method of any of Aspects 1-10, wherein the reference signal information indicates one or more anchor locations, and wherein each anchor location of the one or more anchor locations is associated with a respective reference signal subset of the one or more reference signal subsets.

Aspect 12: The method of Aspect 11, wherein the operating condition of the UE comprises a location of the UE, and wherein selecting the reference signal subset comprises: identifying an anchor location of the one or more anchor locations that is within a distance threshold of the location; and selecting the reference signal subset based at least in part on the anchor location.

Aspect 13: The method of Aspect 11, wherein the reference signal information indicates a respective probability for each reference signal included in each reference signal group.

Aspect 14: The method of Aspect 11, wherein the reference signal information indicates a probability ranking for each reference signal included in each reference signal subset.

Aspect 15: The method of any of Aspects 1-14, further comprising: selecting a preferred reference signal from the set of reference signals based at least in part on a signal quality metric; and transmitting an indication of the preferred reference signal, wherein the reference signal information is based at least in part on the preferred reference signal.

Aspect 16: The method of Aspect 15, wherein each reference signal subset of the one or more reference signal subsets is based at least in part on the preferred reference signal.

Aspect 17: The method of Aspect 16, wherein the one or more reference signal subsets are associated with a validity time window.

Aspect 18: The method of Aspect 17, wherein the validity time window is based at least in part on at least one of: a distance, a speed, or a velocity.

Aspect 19: The method of Aspect 16, wherein a first reference signal subset of the one or more reference signal subsets is associated with a first direction, and wherein a second reference signal subset of the one or more reference signal subsets is associated with a second direction.

Aspect 20: The method of Aspect 19, wherein the operating condition comprises a movement of the UE, and the method comprises: selecting, as the reference signal subset, the first reference signal subset based at least in part on the movement.

Aspect 21: The method of any of Aspects 1-20, further comprising: transmitting an indication of a movement pattern of the UE, wherein the reference signal information is based at least in part on the movement pattern.

Aspect 22: The method of any of Aspects 1-21, wherein receiving the reference signal information comprises: receiving an indication of a machine-learning algorithm configuration that is configured to enable the UE to select the reference signal subset.

Aspect 23: The method of Aspect 22, further comprising: forming a machine-learning algorithm based at least in part on the machine-learning algorithm configuration, wherein selecting the reference signal subset comprises: selecting the reference signal subset based at least in part on using the machine-learning algorithm, wherein selecting the reference signal subset comprises: selecting the reference signal subset based at least in part on using the machine-learning algorithm.

Aspect 24: The method of Aspect 23, wherein the machine-learning algorithm is configured to select the reference signal subset based at least in part on at least one of: a signal metric, or the operating condition of the UE.

Aspect 25: The method of any of Aspects 1-24, further comprising: connecting to a network node, wherein receiving the reference signal information is based at least in part on connecting to the network node.

Aspect 26: The method of any of Aspects 1-25, wherein the set of reference signals comprises a set of synchronization signal blocks.

Aspect 27: A method of wireless communication performed by a network node, comprising: selecting, based at least in part on historic information associated with a set of reference signals and an operating condition associated with a user equipment (UE), one or more reference signal subsets that are based at least in part on the set of reference signals; and transmitting reference signal information that indicates the one or more reference signal subsets that are based at least in part on the set of reference signals.

Aspect 28: The method of Aspect 27, wherein transmitting the reference signal information comprises: transmitting the reference signal information in a broadcast message.

Aspect 29: The method of any of Aspects 27-28, further comprising: receiving a request for the reference signal information, wherein transmitting the reference signal information comprises: transmitting the reference signal information as a response to the request, wherein transmitting the reference signal information comprises: transmitting the reference signal information as a response to the request.

Aspect 30: The method of any of Aspects 27-29, wherein the operating condition comprises at least one of: an operating location associated with the UE, or a preferred reference signal in the set of reference signals.

Aspect 31: The method of any of Aspects 27-30, further comprising: receiving an error indication that indicates that a respective signal metric for each reference signal in a reference signal subset of the one or more reference signal subsets fails to satisfy a signal quality threshold.

Aspect 32: The method of any of Aspects 27-31, wherein transmitting the reference signal information comprises: transmitting the reference signal information in a system information block broadcast message.

Aspect 33: The method of any of Aspects 27-32, wherein transmitting the reference signal information comprises: transmitting a first reference signal subset of the one or more reference signal subsets based at least in part on using a first beam associated with a first propagation direction; and transmitting a second reference signal subset of the one or more reference signal subsets based at least in part on using a second beam associated with a second propagation direction, wherein the first propagation direction is different from the second propagation direction, wherein the first reference signal subset comprises a first combination of reference signals from the set of reference signals, and wherein the second reference signal subset comprises a second combination of reference signals from the set of reference signals.

Aspect 34: The method of any of Aspects 27-33, further comprising: obtaining the historic information from a core network.

Aspect 35: The method of any of Aspects 27-34, wherein the UE is a first UE, and the method further comprises: generating the historic information based at least in part on a transmission associated with at least a second UE and a location of the at least second UE.

Aspect 36: The method of Aspect 35, wherein the transmission is based at least in part on a preferred reference signal selected by the second UE.

Aspect 37: The method of Aspect 35, wherein the transmission is a random access channel.

Aspect 38: The method of any of Aspects 27-37, wherein the UE is a first UE, and wherein the historic information indicates a beam used by a second UE and a location of the second UE when the second UE is using the beam.

Aspect 39: The method of any of Aspects 27-38, wherein the reference signal information indicates one or more anchor locations, and wherein each anchor location of the one or more anchor locations is associated with a respective reference signal subset of the one or more reference signal subsets.

Aspect 40: The method of Aspect 39, wherein the reference signal information indicates a respective probability for each reference signal included in each reference signal subset.

Aspect 41: The method of Aspect 39, wherein the reference signal information indicates a probability ranking for each reference signal included in each reference signal subset.

Aspect 42: The method of any of Aspects 27-41, further comprising: receiving an indication of a preferred reference signal; and selecting the one or more reference signal subsets based at least in part on the preferred reference signal.

Aspect 43: The method of Aspect 42, wherein the one or more reference signal subsets are associated with a validity time window.

Aspect 44: The method of Aspect 43, wherein the validity time window is based at least in part on at least one of: a distance, a speed, or a velocity.

Aspect 45: The method of any of Aspects 27-44, wherein a first reference signal subset of the one or more reference signal subsets is associated with a first direction, and wherein a second reference signal subset of the one or more reference signal subsets is associated with a second direction.

Aspect 46: The method of any of Aspects 27-45, further comprising: receiving an indication of a UE movement pattern, wherein selecting the one or more reference signal subsets comprises: selecting the one or more reference signal subsets based at least in part on the UE movement pattern, wherein selecting the one or more reference signal subsets comprises: selecting the one or more reference signal subsets based at least in part on the UE movement pattern.

Aspect 47: The method of any of Aspects 27-46, wherein receiving the reference signal information comprises: transmitting an indication of a machine-learning algorithm configuration that is configured to enable the UE to select the reference signal subset.

Aspect 48: The method of Aspect 47, wherein the machine-learning algorithm configuration is configured to enable the UE to select the reference signal subset based at least in part on at least one of: a signal metric, or the operating condition of the UE.

Aspect 49: The method of any of Aspects 27-48, further comprising: connecting to the UE, wherein transmitting the reference signal information is based at least in part on connecting to the UE.

Aspect 50: The method of any of Aspects 27-49, wherein the set of reference signals comprises a set of synchronization signal blocks.

Aspect 51: An apparatus for wireless communication at a device, comprising a processor; memory coupled with the processor; and instructions stored in the memory and executable by the processor to cause the apparatus to perform the method of one or more of Aspects 1-26.

Aspect 52: An apparatus for wireless communication at a device, comprising a processor; memory coupled with the processor; and instructions stored in the memory and executable by the processor to cause the apparatus to perform the method of one or more of Aspects 27-50.

Aspect 53: A device for wireless communication, comprising a memory and one or more processors coupled to the memory, the one or more processors configured to perform the method of one or more of Aspects 1-26.

Aspect 54: A device for wireless communication, comprising a memory and one or more processors coupled to the memory, the one or more processors configured to perform the method of one or more of Aspects 27-50.

Aspect 55: An apparatus for wireless communication, comprising at least one means for performing the method of one or more of Aspects 1-26.

Aspect 56: An apparatus for wireless communication, comprising at least one means for performing the method of one or more of Aspects 27-50.

Aspect 58: A non-transitory computer-readable medium storing code for wireless communication, the code comprising instructions executable by a processor to perform the method of one or more of Aspects 1-26.

Aspect 59: A non-transitory computer-readable medium storing code for wireless communication, the code comprising instructions executable by a processor to perform the method of one or more of Aspects 27-50.

Aspect 60: A non-transitory computer-readable medium storing a set of instructions for wireless communication, the set of instructions comprising one or more instructions that, when executed by one or more processors of a device, cause the device to perform the method of one or more of Aspects 1-26.

Aspect 61: A non-transitory computer-readable medium storing a set of instructions for wireless communication, the set of instructions comprising one or more instructions that, when executed by one or more processors of a device, cause the device to perform the method of one or more of Aspects 27-50.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
      receive reference signal information that indicates one or more reference signal subsets that are based at least in part on a set of reference signals, each reference signal subset of the one or more reference signal subsets being based at least in part on historic information associated with the set of reference signals, wherein the reference signal information indicates one or more anchor locations;
      select a reference signal subset from the one or more reference signal subsets based at least in part on an operating condition of the UE, wherein each anchor location of the one or more anchor locations is associated with a respective reference signal subset of the one or more reference signal subsets; and perform a measurement procedure based at least in part on the reference signal subset.

2. The apparatus of claim 1, wherein the one or more processors, to receive the reference signal information, are configured to:
   receive the reference signal information in a broadcast message.

3. The apparatus of claim 1, wherein the one or more processors are further configured to:
   transmit a request for the reference signal information,
   wherein the one or more processors, to receive the reference signal information, are configured to:
      receive the reference signal information as a response to the request.

4. The apparatus of claim 1, wherein the one or more processors, to perform the measurement procedure based at least in part on the reference signal subset, are configured to:
   calculate a respective signal metric for each reference signal of the set of reference signals that is included in the reference signal subset.

5. The apparatus of claim 4, wherein the one or more processors, to perform the measurement procedure based at least in part on the reference signal subset, are configured to:
   refrain from generating a signal metric for at least one reference signal from the set of reference signals that is excluded from the reference signal subset.

6. The apparatus of claim 1, wherein the operating condition of the UE comprises a location of the UE, and
   wherein the one or more processors, to select the reference signal subset, are configured to:
      identify an anchor location of the one or more anchor locations that is within a distance threshold of the location; and
      select the reference signal subset based at least in part on the anchor location.

7. The apparatus of claim 1, wherein the one or more processors are further configured to:
   select a preferred reference signal from the set of reference signals based at least in part on a signal quality metric; and
   transmit an indication of the preferred reference signal,
   wherein the reference signal information is based at least in part on the preferred reference signal.

8. The apparatus of claim 7, wherein each reference signal subset of the one or more reference signal subsets is based at least in part on the preferred reference signal.

9. The apparatus of claim 1, wherein a first reference signal subset of the one or more reference signal subsets is associated with a first direction, and
   wherein a second reference signal subset of the one or more reference signal subsets is associated with a second direction.

10. The apparatus of claim 9, wherein the operating condition comprises a movement of the UE, and
   wherein the one or more processors are further configured to:
      select, as the reference signal subset, the first reference signal subset based at least in part on the movement.

11. The apparatus of claim 1, wherein the one or more processors, to receive the reference signal information, are configured to:
   receive an indication of a machine-learning algorithm configuration that is configured to enable the UE to select the reference signal subset.

12. The apparatus of claim 11, wherein the one or more processors are further configured to:

form a machine-learning algorithm based at least in part on the machine-learning algorithm configuration, wherein the one or more processors, to select the reference signal subset, are configured to:

select the reference signal subset based at least in part on using the machine-learning algorithm.

13. An apparatus for wireless communication at a network node, comprising:

a memory; and one or more processors, coupled to the memory, configured to:

select, based at least in part on historic information associated with a set of reference signals and an operating condition associated with a user equipment (UE), one or more reference signal subsets that are based at least in part on the set of reference signals; and transmit reference signal information that indicates the one or more reference signal subsets that are based at least in part on the set of reference signals, wherein the reference signal information indicates one or more anchor locations, and wherein each anchor location of the one or more anchor locations is associated with a respective reference signal subset of the one or more reference signal subsets.

14. The apparatus of claim 13, wherein the one or more processors, to transmit the reference signal information, are configured to:

transmit the reference signal information in a broadcast message.

15. The apparatus of claim 13, wherein the one or more processors are further configured to:

receive a request for the reference signal information, wherein the one or more processors, to transmit the reference signal information, are configured to:

transmit the reference signal information as a response to the request.

16. The apparatus of claim 13, wherein the one or more processors are further configured to:

receive an error indication that indicates that a respective signal metric for each reference signal in a reference signal subset of the one or more reference signal subsets fails to satisfy a signal quality threshold.

17. The apparatus of claim 13, wherein the one or more processors, to transmit the reference signal information, are configured to:

transmit a first reference signal subset of the one or more reference signal subsets based at least in part on using a first beam associated with a first propagation direction; and transmit a second reference signal subset of the one or more reference signal subsets based at least in part on using a second beam associated with a second propagation direction, wherein the first propagation direction is different from the second propagation direction, wherein the first reference signal subset comprises a first combination of reference signals from the set of reference signals, and wherein the second reference signal subset comprises a second combination of reference signals from the set of reference signals.

18. The apparatus of claim 13, wherein the UE is a first UE, and wherein the historic information indicates a beam used by a second UE and a location of the second UE when the second UE is using the beam.

19. The apparatus of claim 13, wherein the reference signal information indicates a respective probability for each reference signal included in each reference signal subset.

20. The apparatus of claim 13, wherein the reference signal information indicates a probability ranking for each reference signal included in each reference signal subset.

21. The apparatus of claim 13, wherein the one or more processors are further configured to:

receive an indication of a preferred reference signal; and select the one or more reference signal subsets based at least in part on the preferred reference signal.

22. The apparatus of claim 13, wherein a first reference signal subset of the one or more reference signal subsets is associated with a first direction, and wherein a second reference signal subset of the one or more reference signal subsets is associated with a second direction.

23. The apparatus of claim 13, wherein the one or more processors are further configured to:

receive an indication of a UE movement pattern, wherein the one or more processors, to select the one or more reference signal subsets, are configured to:

select the one or more reference signal subsets based at least in part on the UE movement pattern.

24. The apparatus of claim 13, wherein the one or more processors, to receive the reference signal information, are configured to:

transmit an indication of a machine-learning algorithm configuration that is configured to enable the UE to select the reference signal subset.

25. A method of wireless communication performed by a user equipment (UE), comprising:

receiving reference signal information that indicates one or more reference signal subsets that are based at least in part on a set of reference signals, each reference signal subset of the one or more reference signal subsets being based at least in part on historic information associated with the set of reference signals, wherein the reference signal information indicates one or more anchor locations;

selecting a reference signal subset from the one or more reference signal subsets based at least in part on an operating condition of the UE, wherein each anchor location of the one or more anchor locations is associated with a respective reference signal subset of the one or more reference signal subsets; and performing a measurement procedure based at least in part on the reference signal subset.

26. The method of claim 25, wherein performing the measurement procedure based at least in part on the reference signal subset comprises:

calculating a respective signal metric for each reference signal of the set of reference refraining from generating a signal metric for at least one reference signal from the set of reference signals that is excluded from the reference signal subset.

27. A method of wireless communication performed by a network node, comprising:

selecting, based at least in part on historic information associated with a set of reference signals and an operating condition associated with a user equipment (UE), one or more reference signal subsets that are based at least in part on the set of reference signals; and transmitting reference signal information that indicates the one or more reference signal subsets that are based at least in part on the set of reference signals, wherein the reference signal information indicates one or more anchor locations, and wherein each anchor location of the one or more anchor locations is associated with a respective reference signal subset of the one or more reference signal subsets.

28. The method of claim 27, further comprising: receiving an indication of a preferred reference signal; and selecting the one or more reference signal subsets based at least in part on the preferred reference signal.

29. The method of claim 25, further comprising:

receiving the reference signal information in a broadcast message.

30. The method of claim 25, further comprising:

transmitting a request for the reference signal information, wherein receiving the reference signal information comprises receiving the reference signal information as a response to the request.

\*     \*     \*     \*     \*